(12) United States Patent
Denuto et al.

(10) Patent No.: US 6,195,477 B1
(45) Date of Patent: Feb. 27, 2001

(54) HYBRID FIBER OPTIC LIGHTING DISTRIBUTION SYSTEM

(75) Inventors: John V. Denuto, Warren; Alan B. Toot, Niles; Matthew S. Mrakovich, Canfield, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/190,787

(22) Filed: Nov. 12, 1998

(51) Int. Cl.[7] .................................. G02B 6/26; F21V 7/04
(52) U.S. Cl. .................................. 385/15; 385/27; 385/38; 385/55; 385/115; 385/901; 362/551; 362/553; 362/554; 362/556
(58) Field of Search .................................. 385/15, 27, 38, 385/55, 56, 59, 60, 77, 78, 115, 901; 362/551, 553, 554, 556

(56) References Cited

U.S. PATENT DOCUMENTS

| | | | |
|---|---|---|---|
| 4,860,172 | * 8/1989 | Schlager et al. | 385/901 X |
| 4,887,190 | * 12/1989 | Sadamune et al. | 385/901 X |
| 5,000,535 | * 3/1991 | Churchill | 385/901 X |
| 5,042,894 | * 8/1991 | Swemer | 385/33 |
| 5,365,413 | * 11/1994 | Krammer | 385/901 X |
| 5,436,805 | * 7/1995 | Hsu et al. | 385/901 X |
| 5,661,837 | * 8/1997 | Yamamoto et al. | 385/115 |
| 6,071,001 | * 6/2000 | Denuto et al. | 385/901 X |

\* cited by examiner

*Primary Examiner*—Brian Healy
(74) *Attorney, Agent, or Firm*—Richard A. Jones

(57) ABSTRACT

A robust hybrid fiber optic lighting distribution system incorporating a light source and two fiber optic media to thereby provide high temperature tolerance adjacent the light source and inexpensive and easily maintained light distribution to geographically independent illumination features downstream from the light source. The hybrid fiber optic distribution system includes a light source, a plurality of multi-stranded glass optical fiber (GOF) leads forming part of an optical jumper optically interfaced with the light source, and a plurality of solid core plastic optical fiber (POF) leads forming part of an optical distributor optically interfaced with the optical jumper which provide light distribution to various illumination features throughout the motor vehicle.

7 Claims, 16 Drawing Sheets

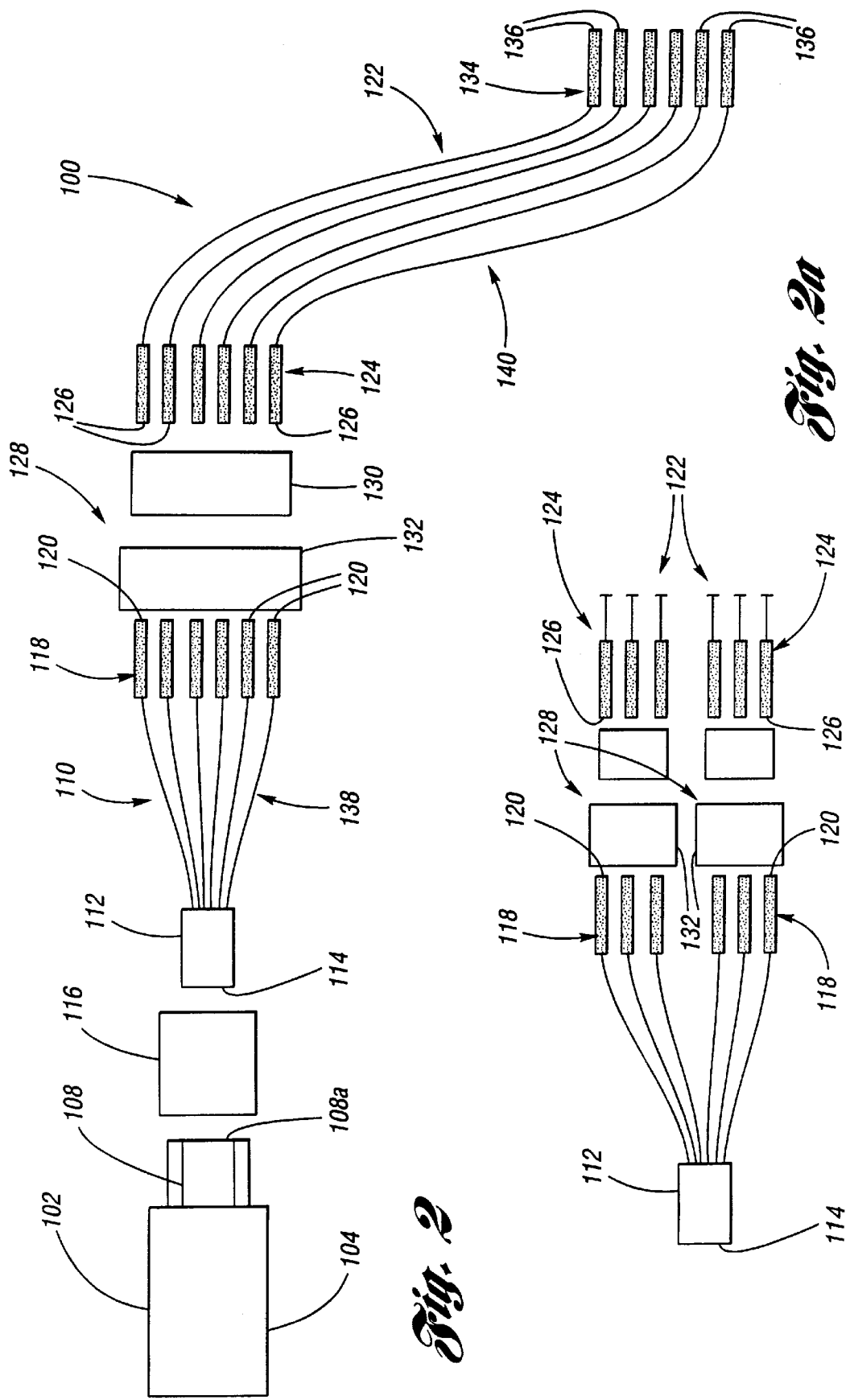

HYBRID FIBER OPTIC LIGHTING DISTRIBUTION SYSTEM

TECHNICAL FIELD

The present invention relates to fiber optic systems, and more particularly to a lighting distribution system which is a hybrid of dual optical fiber media.

BACKGROUND OF THE INVENTION

As motor vehicles become increasingly sophisticated, there is an attendant need for distributed lighting to a variety of locations of the motor vehicle. While discrete conventional light sources, such as incandescent bulbs, may be placed wherever lighting is desired, there are distinct disadvantages to this mode of lighting. For example, each illumination location (illumination feature) requires a separate bulb and bulb fixture, as well as a separate power lead. These requirements of discrete conventional light sources are undesirably complex and costly, and involve excessive maintenance and increased vehicular weight.

It would, therefore, be a major benefit if a fiber optic distributed lighting system could be used in place of a multiplicity of discrete light sources. However, fiber optic distributed lighting has the draw back that a source of light having sufficient brilliance to adequately illuminate a number of illumination features would require high temperature tolerant fiber optic media. Unfortunately, although available, such fiber optic media are prohibitively expensive to use throughout the fiber optic lighting distribution system.

Accordingly, what is needed in the art is a fiber optic lighting distribution system which is high temperature tolerant only where required, is inexpensive and easily maintained.

SUMMARY OF THE INVENTION

The present invention is a robust hybrid fiber optic lighting distribution system which incorporates a light source and two fiber optic media to thereby provide high temperature tolerance adjacent the light source and inexpensive and easily maintained light distribution to geographically independent illumination features downstream from the light source.

The hybrid fiber optic distribution system according to the present invention is composed generally of a light source, a plurality of multi-stranded glass optical fiber (GOF) leads forming part of an optical jumper optically interfaced with the light source, and a plurality of solid core plastic optical fiber (POF) leads forming part of an optical distributor optically interfaced with the optical jumper.

The light source is preferably composed of a self contained module providing a high intensity light, such as for example a halogen light source module. The light source module produces substantial heat and operates at elevated temperature. One end of the GOF leads provides a heat tolerant fiber optic media at the optical interface with the light source module. The POF leads are optically interfaced with the other end of respective GOF leads a safe distance from the heat of the light source module. The POF leads then provide light distribution to various illumination features throughout the motor vehicle.

While the prior art alternative, as shown at FIG. 1, is a fiber optic light distribution system 10 incorporating exclusively GOF leads 12 or exclusively special high temperature tolerant POF leads 12' for distributing light from a light source 14 to geographically remote illumination features 16, these fiber optic media are prohibitively expensive and suffer from a variety of other difficulties, including manufacture and installation complexity, light discoloration, and insufficient robustness.

However, by combining GOF leads and POF leads into one fiber optic light distribution system, a number of benefits are enjoyed:

the high temperature tolerance of the GOF leads allows for a wide latitude of light source module optimization;

the GOF leads provide safe geographic separation of the temperature intolerant POF leads from the proximity of the light source module;

optimization of the fiber optic media reduces cost and enhances performance;

dual fiber optic media provides simplified servicing, as for example the entire optical jumper may be replaced, and POF leads may be individually replaced;

variability of the diameter of individual glass optical fiber leads with the number of individual fiber optic strands in each lead allows core diameter optimization for maximum light transmission;

the grouping of bundled GOF leads is shape optimizable for transmission of light from the light source module into the optical jumper; and manufacturability of individual POF leads in an automated manner without necessity to group the POF leads into a common ferrule at the light source.

Accordingly, it is an object of the present invention to provide a dual optical fiber media light distribution system.

It is an additional object of the present invention to provide a high temperature tolerant optical jumper for optical interface with a high intensity light source module.

It is a further object of the present invention to provide a high temperature intolerant optical distributor for light distribution to geographically remote illumination features downstream of the optical jumper.

These, and additional objects, advantages, features and benefits of the present invention will become apparent from the following specification.

BRIEF DESCRIPTION OF THE DRAWINGS

FIG. 2 is an exploded schematic of a hybrid fiber optic lighting distribution system according to the present invention.

FIG. 2A is a portion of the exploded schematic from FIG. 2, now showing a plurality of coupling assemblies are depicted.

FIGS. 4 through 30 depict a preferred example for carrying out the present invention, wherein:

FIG. 4 is a perspective view of the fiber optic light source module according to the present invention;

FIG. 5 is a second perspective view of the fiber optic light source module, wherein the access cover has been removed;

FIG. 6 is a perspective view of the lamp holder of the fiber optic light source module;

FIG. 7 is a perspective view of a base of the fiber optic light source module;

FIG. 8 is an exploded front perspective view of the fiber optic light source module, showing in particular the upper and lower rod supports thereof;

FIG. 9 is a perspective view of the base of the fiber optic light source module, showing the light transmission coupling rod and its resilient grommet intermitted with the lower rod support;

FIG. 10 is a perspective view of the access cover of the fiber optic light source module according to the present invention;

FIG. 11 is a rear end view of the lamp holder of the fiber optic light source module;

FIG. 12 is an exploded perspective view of the connector assembly according to the present invention, shown in operation with respect to a bundled plurality of glass optical fiber leads;

FIG. 13 is a perspective view of a connector ferrule of the connector assembly shown in FIG. 12;

FIG. 14 is a rear perspective view of the connector ferrule, showing the interior surfaces thereof for guiding a plurality of glass optical fiber leads;

FIG. 15 is a perspective view of the connector housing;

FIG. 16 is a front view of the connector housing, showing the connection member thereof for interfacing with a fiber optic light source module;

FIG. 17 is a partly sectional side view of the connector housing;

FIG. 18 is a side elevational view of the fiber optic light source module, shown in operation with respect to a connector housing of connection assembly of a hybrid fiber optic light distribution system;

FIG. 19 is a partly sectional side view of the fiber optic light source module and connector housing of FIG. 18.

FIG. 20 is a partly sectional side view of the connector assembly shown in operation with respect to a fiber optic light source module and the plurality of glass optical fiber leads;

FIG. 21 is a perspective view of the coupling assembly according to the present invention, shown in operation optically interfacing a plurality of glass optical fiber leads to a plurality of plastic optical fiber leads;

FIG. 22 is an exploded perspective view of the coupling assembly as operationally shown in FIG. 21;

FIG. 23 is an exploded view of the coupling assembly;

FIG. 24 is a perspective view of a second coupling member and an alignment body according to the present invention;

FIG. 25 is a front end view of the alignment body according to the present invention;

FIG. 26 is a partly sectional perspective view of the second coupling member according to the present invention;

FIG. 27 is a perspective view of a first coupling member according to the present invention;

FIG. 28 is a perspective view of the second coupling member according to the present invention;

FIG. 29 is a partly sectional side view of the first coupling member and the alignment body according to the present invention; and FIG. 30 is a partly sectional side view of the coupling assembly, shown in operation.

DESCRIPTION OF THE PREFERRED EMBODIMENT

Figure 1:
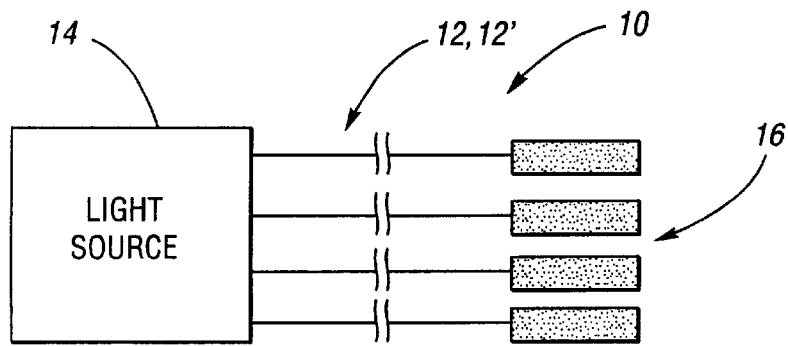
FIG. 1 is a schematic of a prior art fiber optic light distribution system.
Figure 3:
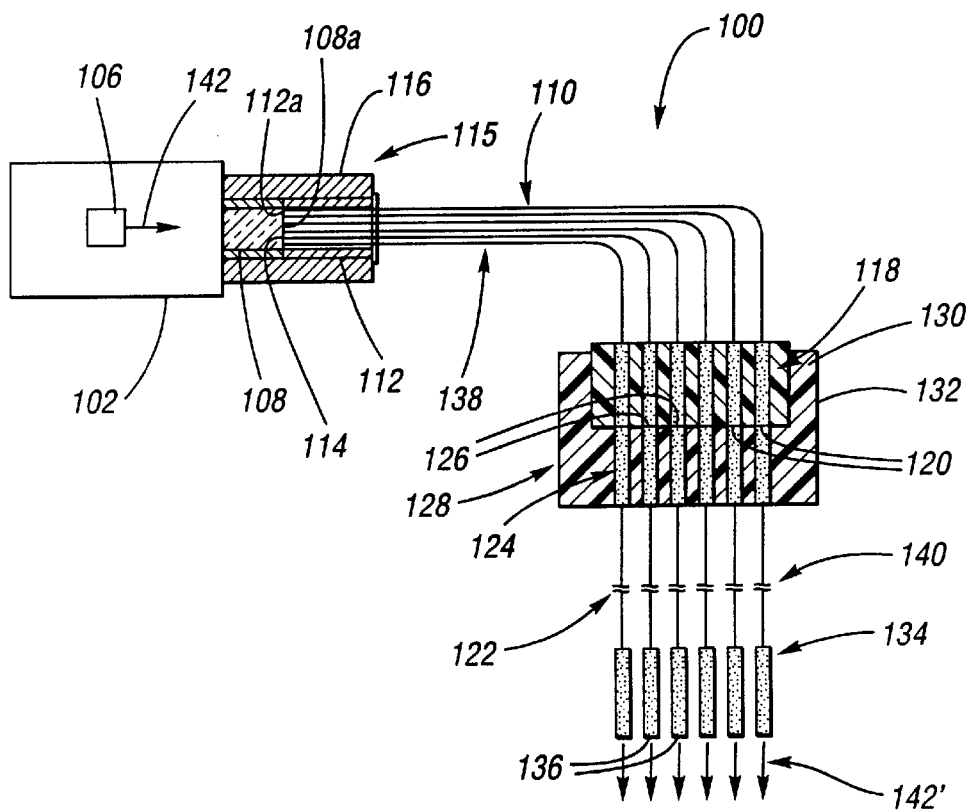
FIG. 3 is a schematic of an implementation of the hybrid fiber optic lighting distribution system of FIG. 2.

Referring now to FIGS. 2 and 3 of the Drawing, the hybrid fiber optic distribution system 100 according to the present invention will be detailed.

Referring firstly to FIG. 2, a schematic of the hybrid fiber optic distribution system 100 is depicted.

Light is generated by a fiber optic light source module 102. The fiber optic light source module 102 includes a housing 104 which houses an electrically powered lighting member and supports a light transmission coupling rod 108 having a rod face 108a.

A plurality of glass optical fiber (GOF) leads 110 is bundled via a connector ferrule 112. The connector ferrule 112 provides a common plane GOF upstream face 114 at a near end of the GOF leads 110. The connector ferrule 112 is seated into a connector housing 116 which snappingly engages to the housing 104 of the fiber optic light source module 102 such that the GOF upstream face 114 is aligningly proximal the rod face 108a. The connector ferrule 112 and the connector housing 116 collectively form a connector assembly 115 (see FIG. 3).

The length of the GOF leads 110 is predetermined so that the distal end thereof is geographically remote from the heat being generated by the fiber optic light source module 102. The distal end of each GOF lead 110 is characterized, respectively, by a first ferrule 118 and an individual GOF downstream face 120.

A plurality of plastic optical fiber (POF) leads 122 is provided, one POF lead for each GOF lead 110. A near end of each POF lead 122 is characterized, respectively, by a second ferrule 124 and an individual POF upstream face 126. The length of each POF lead 122 is preselected to provide light transmission to respectively selected locations of the motor vehicle.

In order to align and affixedly position each individual GOF downstream face 120 with its respective individual POF upstream face 126, a coupling assembly 128 is provided. A first coupling member 130 of the coupling assembly 128 is snappingly interconnected with a second coupling member 132 of the coupling assembly. The first ferrules 118 are affixed to one of the first coupling member 130 or second coupling member 132, and the second ferrules 124 are affixed to the other.

The distal end of each POF lead 122 is provided with a terminal ferrule 134 which is plugged into a port of an illumination feature. In this regard, each individual POF downstream face 136 provides light to the illumination feature fiber optically transmitted from the light source module 102.

Accordingly, the combination of the connector ferrule 112, high temperature tolerant GOF leads 110 and first ferrules 118 provide an optical jumper 138 for durably withstanding the high temperature generated by the light source module 102. Accordingly further, the combination of the second ferrules 124, high temperature intolerant POF leads 122 and terminal ferrules 134 provide an optical distributor 140 for inexpensively transmitting light to geographically distributed illumination features.

It is to be understood, as depicted at FIG. 2A, that any number of coupling assemblies 128 may be utilized for the hybrid fiber optic lighting distribution system according to the present invention.

Referring now to FIG. 3, a schematic implementation of the hybrid fiber optic lighting distribution system 100 is depicted, wherein like reference numbers refer to like functioning components depicted at FIG. 2.

The light source module 102 utilizes a high light output electrically operated lighting member 106, such as for example a halogen light source. Light 142 from the lighting member 106 is received by the coupling rod 108 is a high temperature tolerant, glass optical quality rod having preferably a square cross-section inclusive of the rod face 108a.

The connector ferrule 112 provides an interior space for bundling a round shape cross-section of the GOF leads 110 entering thereinto into the common plane GOF upstream face 114 at a front opening 112a thereof which provides a shape of the GOF upstream face that matches the cross-section of the rod face 108a. In this regard, the GOF leads 110 are in the form of multi-stranded high temperature glass optical fibers wherein the cores thereof are stripped of the protective jacket and affixed to the front opening 112a by epoxy. The connector housing 116 seatably receives therein the connector ferrule 112 with a snap fit. The connector housing 116, in turn, snappingly engages the aluminum housing 104 of the fiber optic light source module 102 so that the GOF upstream face 114 is precisely aligned therewith and is proximal the rod face 108a. By "proximal" is meant spaced apart by preferably not over about one-half millimeter.

As mentioned hereinabove, the distal end of each GOF lead 110 is provided with a first ferrule 118 having an individual GOF downstream face 120.

The plurality of POF leads 122 are preferably in the form of solid core plastic optical fiber, one POF lead for each GOF lead 110. As mentioned hereinabove, the near end of each POF lead 122 is provided with a second ferrule 124 and has a discrete POF upstream face 126. The length of each POF lead 122 is individually preselected to provide transmission of light to a respectively selected location of the motor vehicle.

The coupling assembly 128 precisely aligns each individual POF upstream face 126 with its respective individual GOF downstream face 120 and maintains a spring biased aligningly proximal position therebetween. In this regard, the first coupling member and second coupling member 130, 132 affix, respectively, the first and second ferrules 118, 124 in a predetermined pattern that provides clearance for each individual alignment. For example, the first and second coupling members 130, 132 may be provided with ferrule cavities for receiving, respectively, individual first and second ferrules 118, 124, and when the first and second coupling members are snapped together the alignment and spring biased proximity are automatically achieved and maintained.

The second and terminal ferrules 124, 134 may or may not be the same. The terminal ferrules 134 provide plug-in interconnection with various respective illumination features of the motor vehicle, such as for example dashboard lighting, door handle lighting and lighting for other interior and/or exterior locations. In this regard, each individual POF downstream face 136 provides light 142' to the illumination feature fiber optically transmitted from the light source module 102.

It is to be understood that the GOF leads 110 are temperature tolerant of the temperature immediately adjoining the light source module 102, and that the POF leads 122 are temperature tolerant below a predetermined temperature, wherein the coupling 128 is at a location whereat the temperature is below the predetermined temperature.

A preferred example of a hybrid fiber optic lighting distribution system according to the present invention shall now be detailed with respect to FIGS. 4 through 30.

Figure 4:
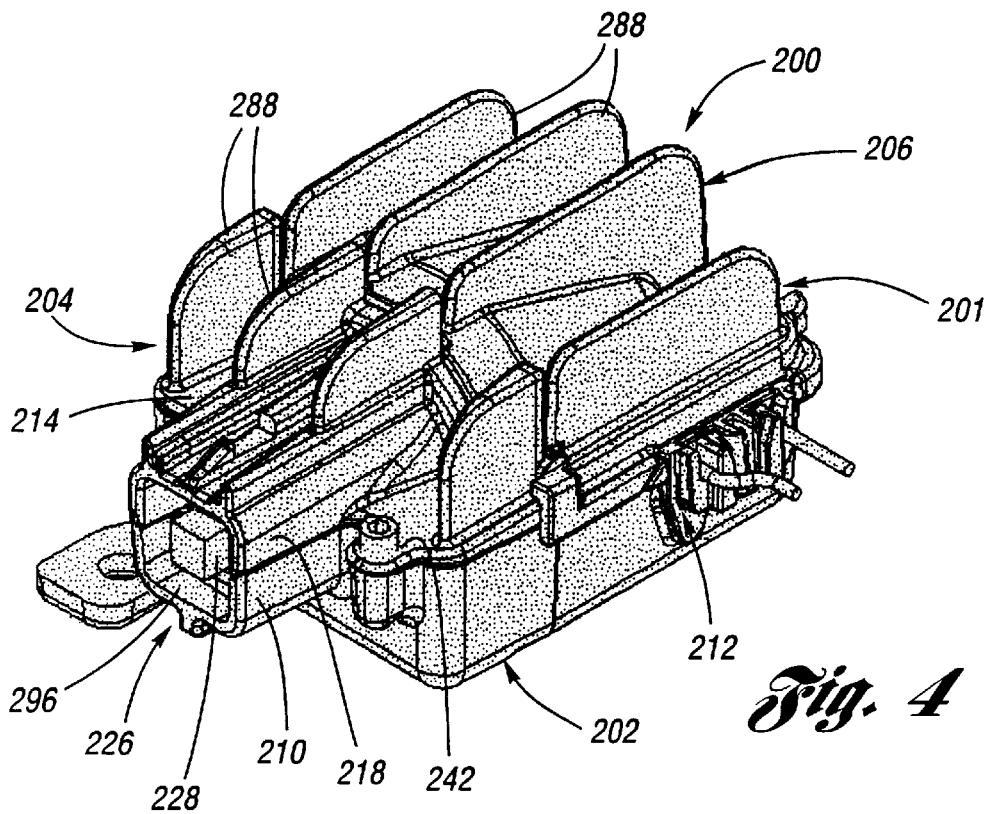
Figure 5:
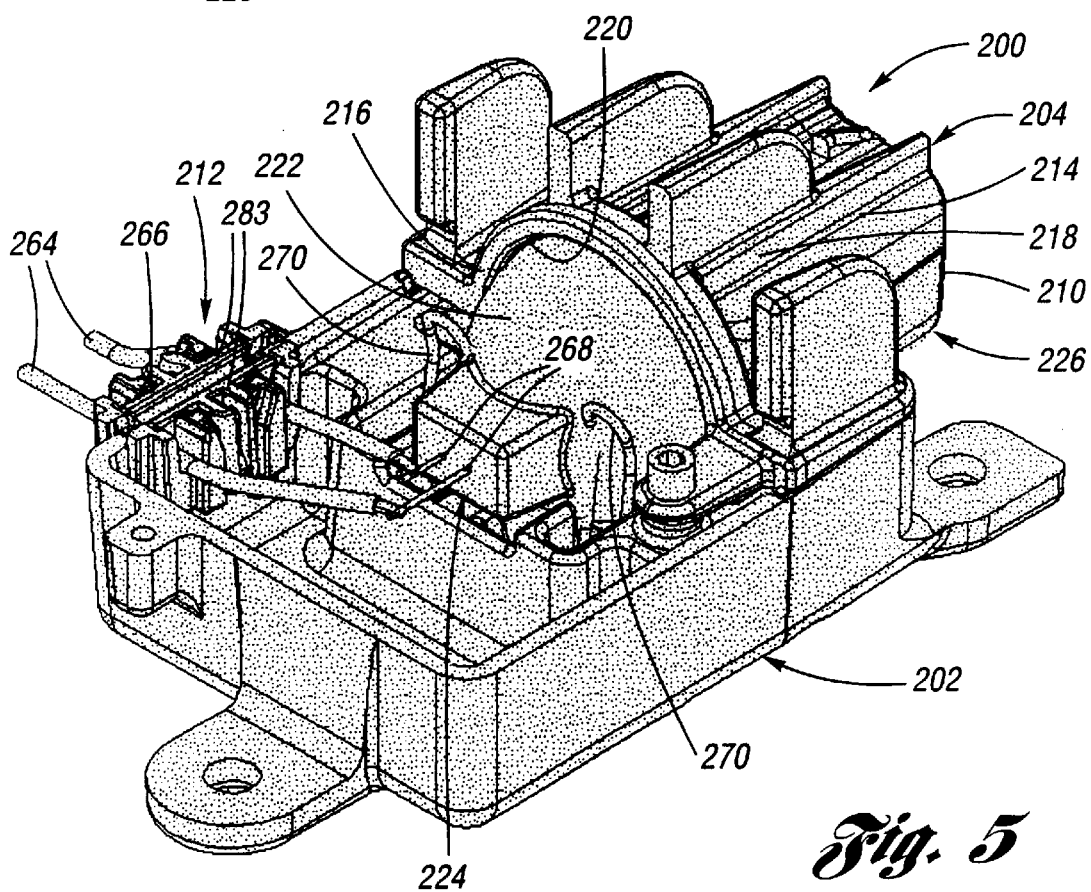

FIGS. 4 and 5 show the fiber optic light source module (FOLSM) 200 according to the present invention. The FOLSM 200 includes a housing 201 composed of a base 202, a lamp holder 204 removably connected to a forward portion of the base and an access cover 206 removably connected to a rearward portion of the base. The base 202 has a lamp cavity 208 (see FIG. 7), a lower rod support 210 which communicates with the lamp cavity and an electrical lead port 212. The lamp holder 204 has an integral front cover 214 for in part covering the lamp cavity 208, an annular lamp support member 216 and an upper rod holder 218. The lamp support member 216 has a stepped rim 220 for capturing the concave mirror 222 of a lamp 224. The upper and lower rod supports 218, 210 collectively form a rod support 226, wherein a square cross-sectioned light transmission connecting rod 228 is seated therein via a resilient grommet 230 (see FIG. 9). An optics chamber 221 is formed by a portion of the lamp cavity 208 and the lamp holder 204, whereat the lamp 224 transmits light to the light transmission connecting rod 228 (see FIG. 19).

The details of the FOLSM 200 will now be further elaborated with additional reference to FIGS. 6 through 11 and 18 through 20.

Figure 6:
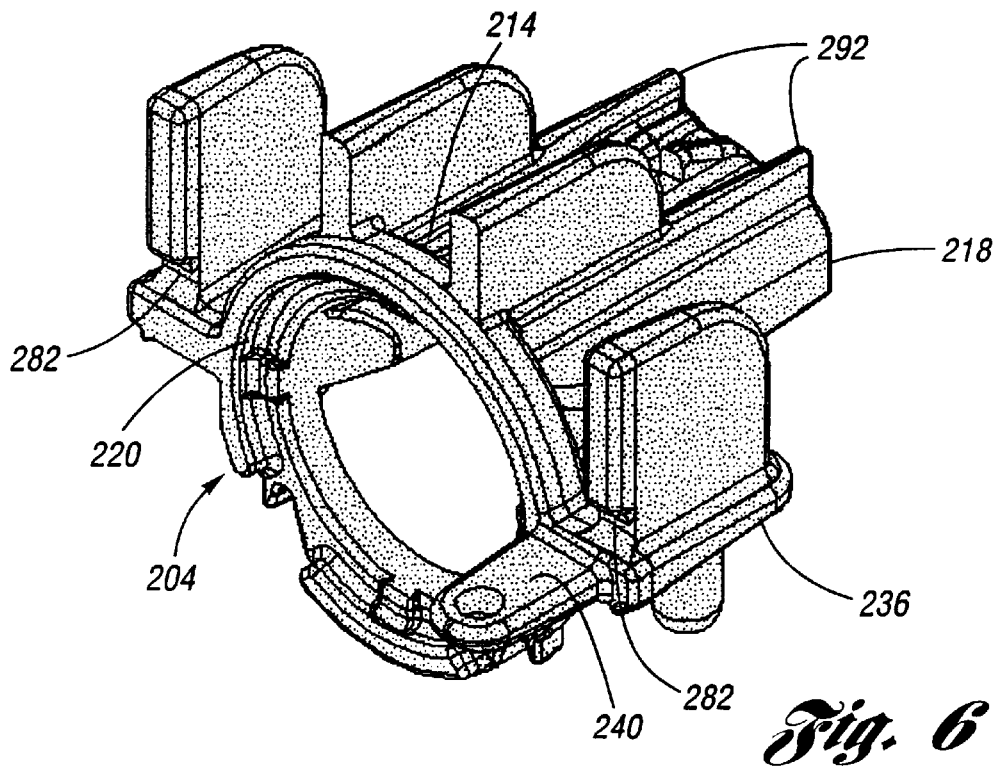
Figure 7:
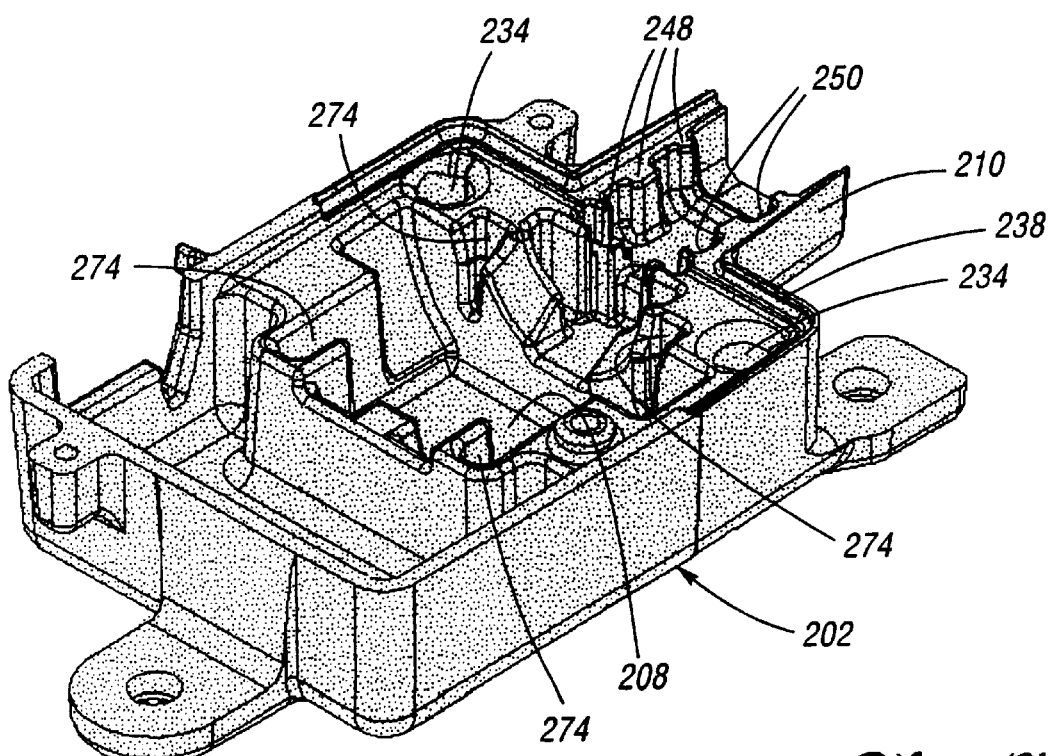
Figure 8:
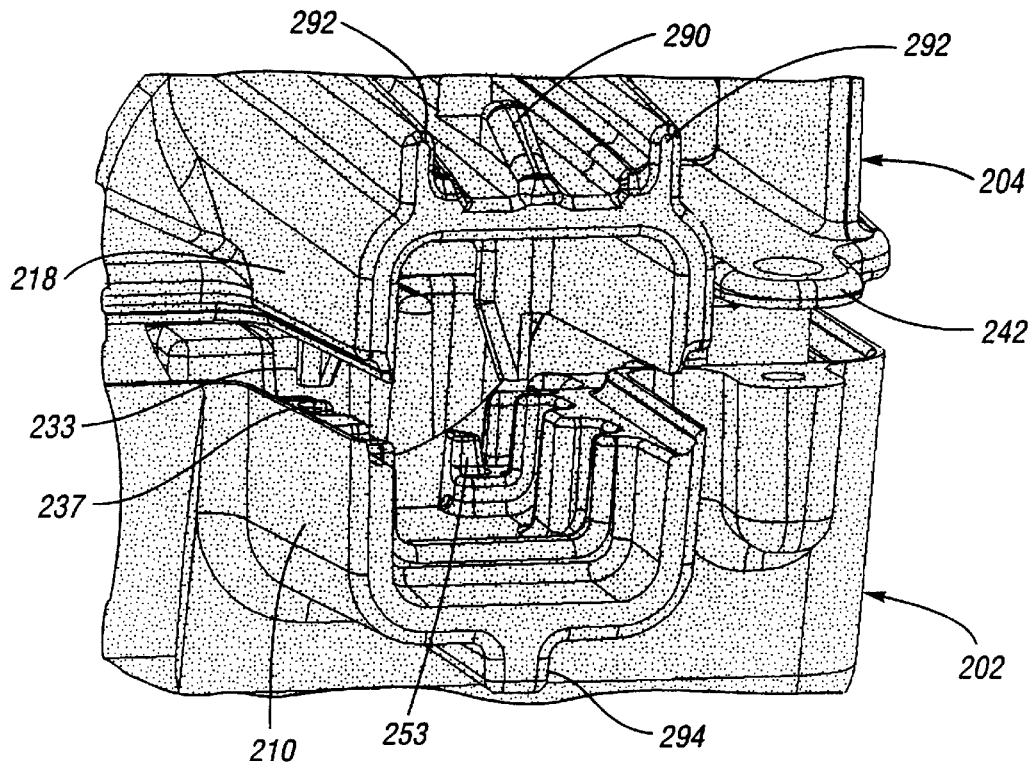

As shown best at FIGS. 6 and 7, the lamp holder 204 has a pair of posts 232 which are alignably received into post holes 234 of the base 202. The lamp holder 204 has a stepped lower edge 236 which sealingly interfaces to a stepped upper edge 238 of the base 202, wherein the mating is drafted fore to aft. First and second tabs 240, 242 are individually screwed to the base, wherein the first tab is covered by the access cover 206. When the lamp holder 204 is connected with the base 202, the lamp support member 216 is in part located within the lamp cavity 208, and the optics chamber 221 is formed.

Figure 11:
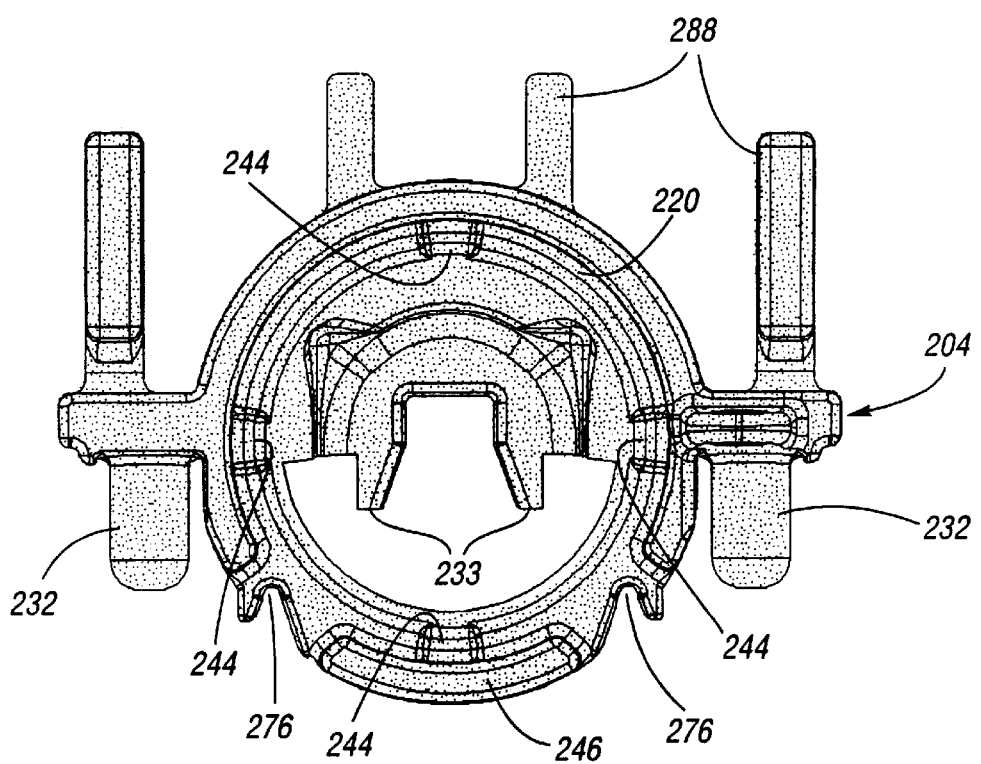

As seen best by simultaneous reference to FIGS. 5, 6 and 11, the concave mirror 222 interfaces receivably into the stepped rim 220, wherein bosses 244, located equidistantly therearound, engage the concave mirror. A lip 246 aids centering of the concave mirror 222 with respect to the bosses 244.

Figure 9:
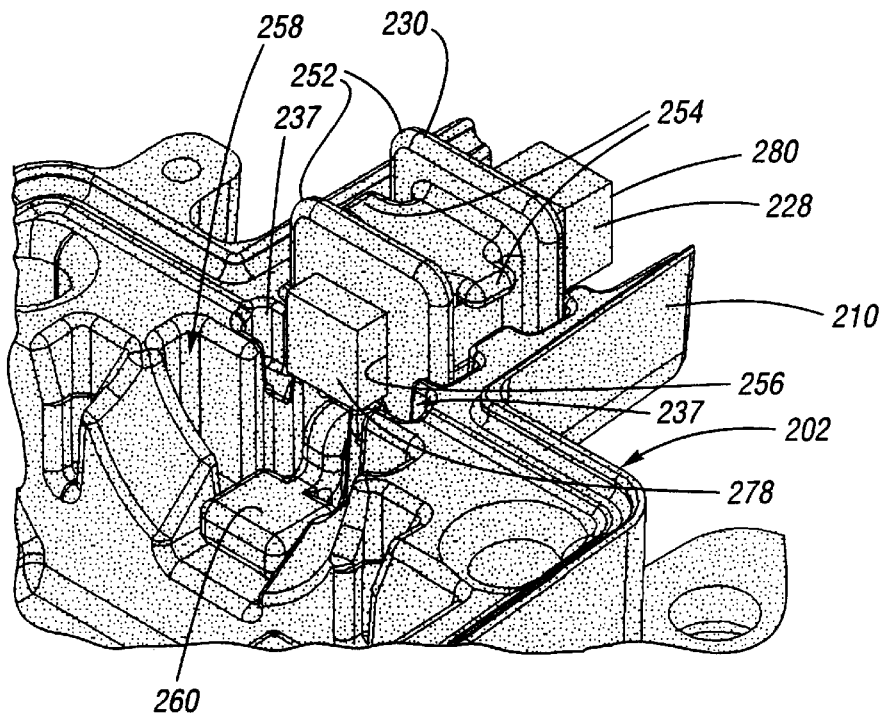
Figure 10:
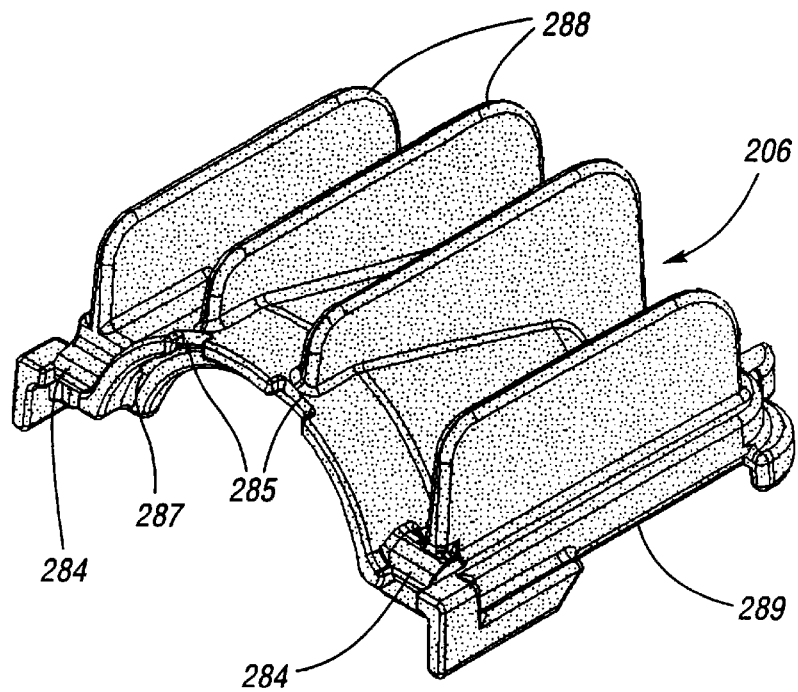

As indicated hereinabove, when the lamp holder 204 is connected to the base 202, the upper and lower rod supports 218, 210 collectively form the rod support 226. The lower rod support 210 has ribs 248 which define grooves 250 for receiving beads 252 of the resilient grommet 230. A tab 254 of the resilient grommet 230 prevents improper installation into the lower rod support 210. The resilient grommet 230 has a square cross-sectioned central bore 256 for snugly receiving therein the square cross-sectioned light transmission connecting rod 228. The light transmission coupling rod 228 is composed of glass and has a shrink wrap teflon cladding 235 (see FIG. 19). In operation, as shown at FIG. 9, the light transmission connecting rod 228 is first received into the central bore 256, then the resilient grommet 230 is placed into the lower rod support 210. When the lamp holder 204 is connected with the base 202, the upper rod support 218 sealingly and aligningly engages the beads 252 of the resilient grommet 230. An opening 296 is formed between the rod support 226 and the light transmission connecting rod 230 extending substantially from the outer face 280 to the resilient grommet 230.

As shown at FIGS. 7 and 9, the lamp cavity 208 adjacent the lower rod holder 210 has an infra-red (IR) filter holder 258, wherein a foot 260 of the resilient grommet 230 forms a resilient lower part thereof. An IR filter 262 is shown in place in the IR filter holder at FIG. 19.

A wire spring 270 engages the base 202 via guides 274 and engages the lamp support member via notches 276 thereof as the lamp holder is installed on the base. Now, the lamp 224 is installed on the lamp holder, whereupon the wire spring presses upon the concave mirror seatably with respect to the lamp support member 216. Electrical leads 264 pass through the electrical lead port 212 which includes a strain relief member 266 for preventing untoward tugs upon the electrical leads from disturbing the lamp 224. The electrical leads 264 are welded to the lamp leads 268 to ensure long term good contact under high heat and vibratory conditions. The lamp 224 preferably utilizes a halogen type bulb 225 (see FIG. 19).

Installation of the lamp holder with respect to the base is guided by the posts 232 and post holes 234. During installation, the upper rod support 218 interfaces with the light transmission connecting rod 228 firstly via flared alignment guides 233, which serve to properly align the light transmission connecting rod. The alignment guides 233 enter into alignment guide slots 237 of the lower rod support 210. Posts 253 (see FIG. 8) prevent the light transmission connecting rod from being pushed out of position when the lamp holder 204 is installed.

With comparison between FIGS. 4 and 5, it will be appreciated that because the lamp support member 216 is integral with the upper rod support 218, when the concave mirror 222 is seated at the stepped rim 220 the lamp 224 is automatically aligned with respect to the light transmission connecting rod 228. Accordingly, upon installation of the lamp 224 and the light transmission connecting rod 228, the optics of the optics chamber 221 are complete, and the concave mirror 222 reflects the light from the bulb to an inner face 278 of the light transmission connecting rod, whereupon it is transmitted to the outer face 280 thereof.

The rear of the lamp holder 204 is provided with a pair of notches 282 which capture respective shoes 284 of the access cover 206. Opposite the shoes 284 the access cover is provided with a tab 286 which is screwed to the base. The access cover 206 is removable independently of the lamp holder 204, whereby the bulb can be serviced without disturbance of the optics. The access cover 206 has a stepped lip 287 which sealingly engages the lamp support member 216. The access cover also has a cut-out 289 for sealing with respect to panels 283 of the strain relief 266. The access cover further has notches 285 at the stepped lip 287 for accommodating fins 288 of the lamp holder 204.

As shown at FIG. 4, both the access cover 206 and the front cover 214 of the lamp holder 204 are provided with a plurality of fins 288. In this regard, heat dissipation from the halogen bulb is facilitated by an anodized surface finish of the aluminum of the housing 201.

Operation of the FOLSM 200 with respect to the hybrid fiber optic lighting distribution system will be discussed at the conclusion of elaboration of the connector assembly 300.

Figure 12:
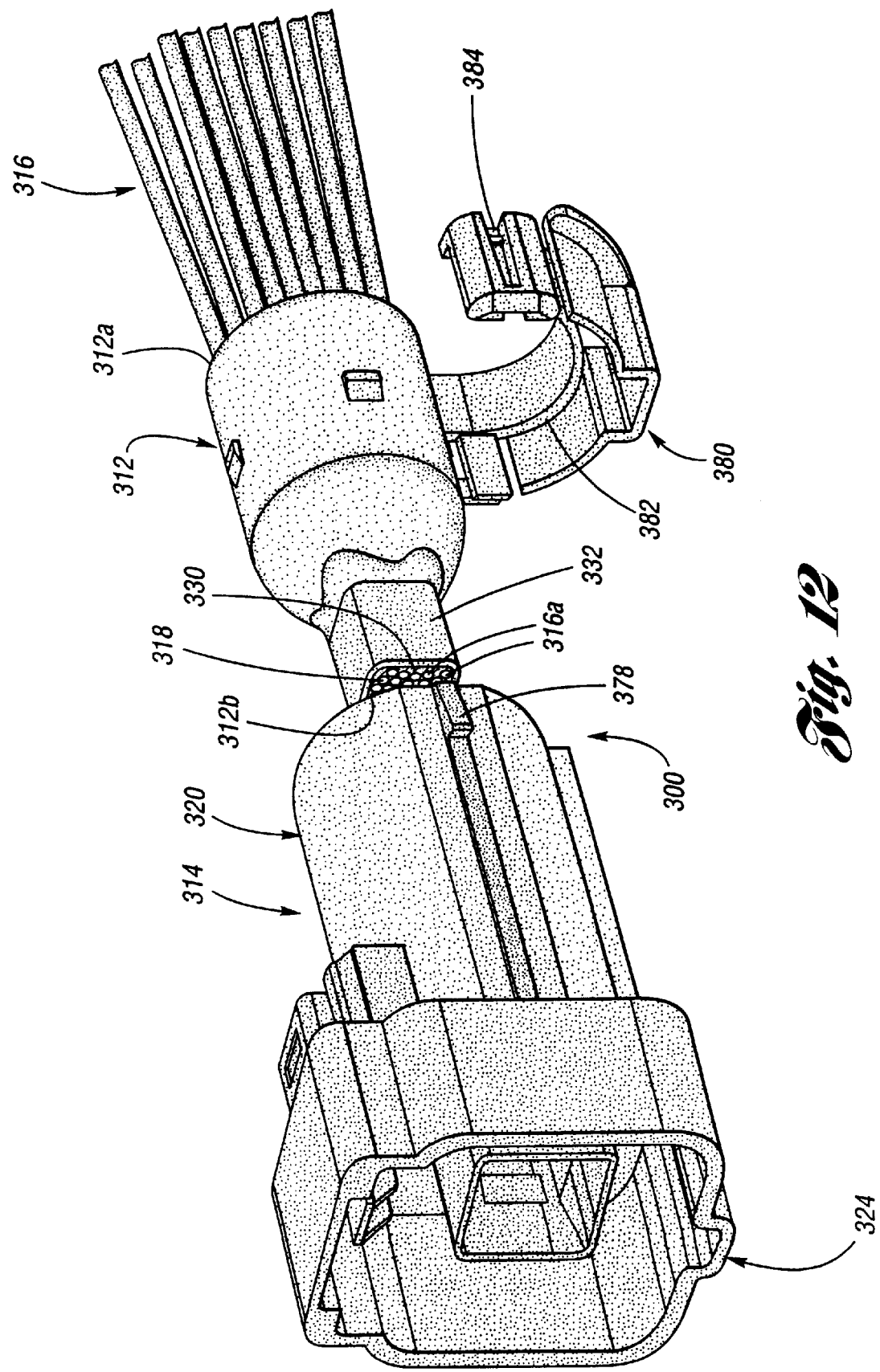
Figure 13:
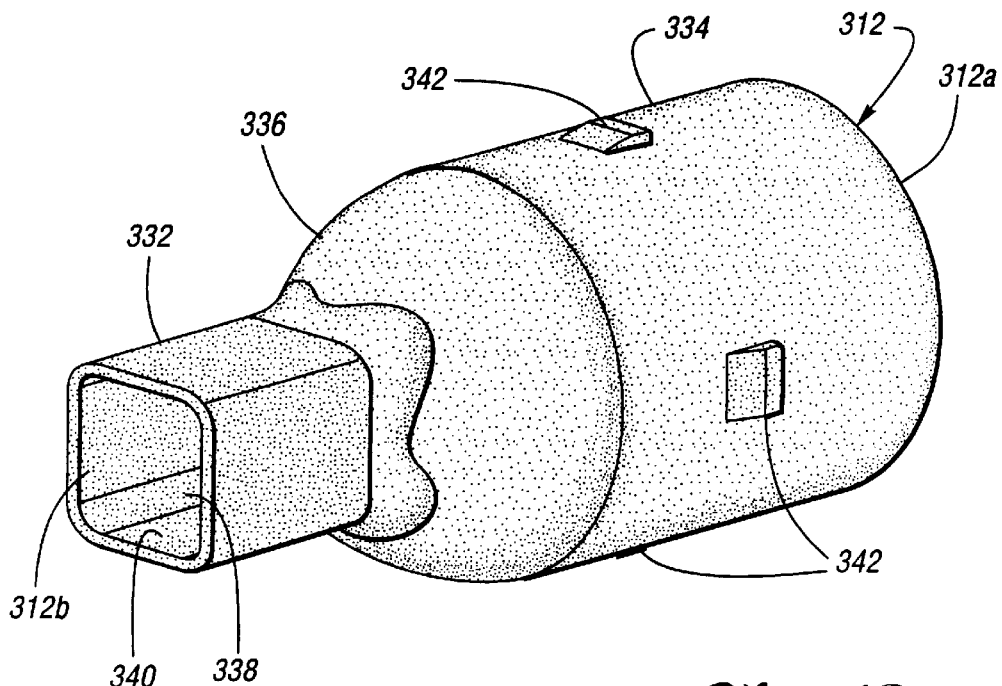
Figure 20:
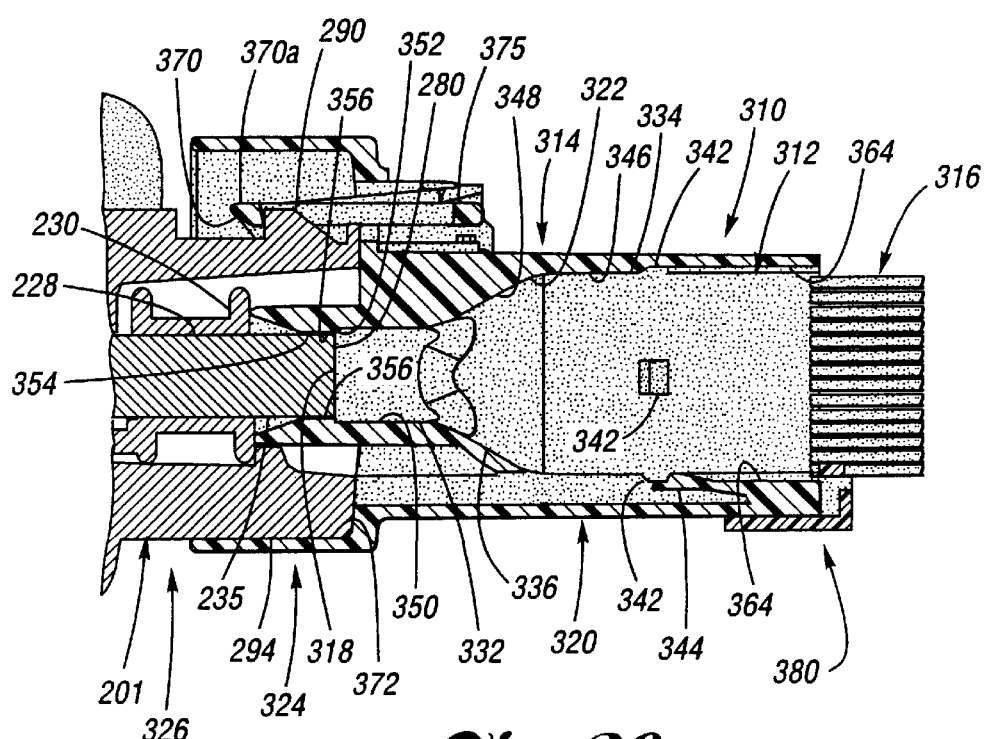

Referring now to FIGS. 12 and 20, shown is the connector assembly 300 which includes a connector ferrule 312 and a connector housing 314. The connector ferrule 312 bundles a plurality of glass optical fiber (GOF) leads 316 into a common plane GOF upstream face 318. The connector housing 314 has a casing member 320 having an interior hollow 322 for receiving the connector ferrule 312. The connector housing 314 further has a connection member 324 for affixing the connector ferrule 312 to the FOLSM light source module 200, wherein the GOF upstream face 318 is optically interfaced with the square cross-sectioned light transmission connecting rod 228. Preferably, the connector ferrule 312 and the connector housing 314 are each composed of molded plastic resistant to the high heat output of the FOLSM 200.

Figure 22:
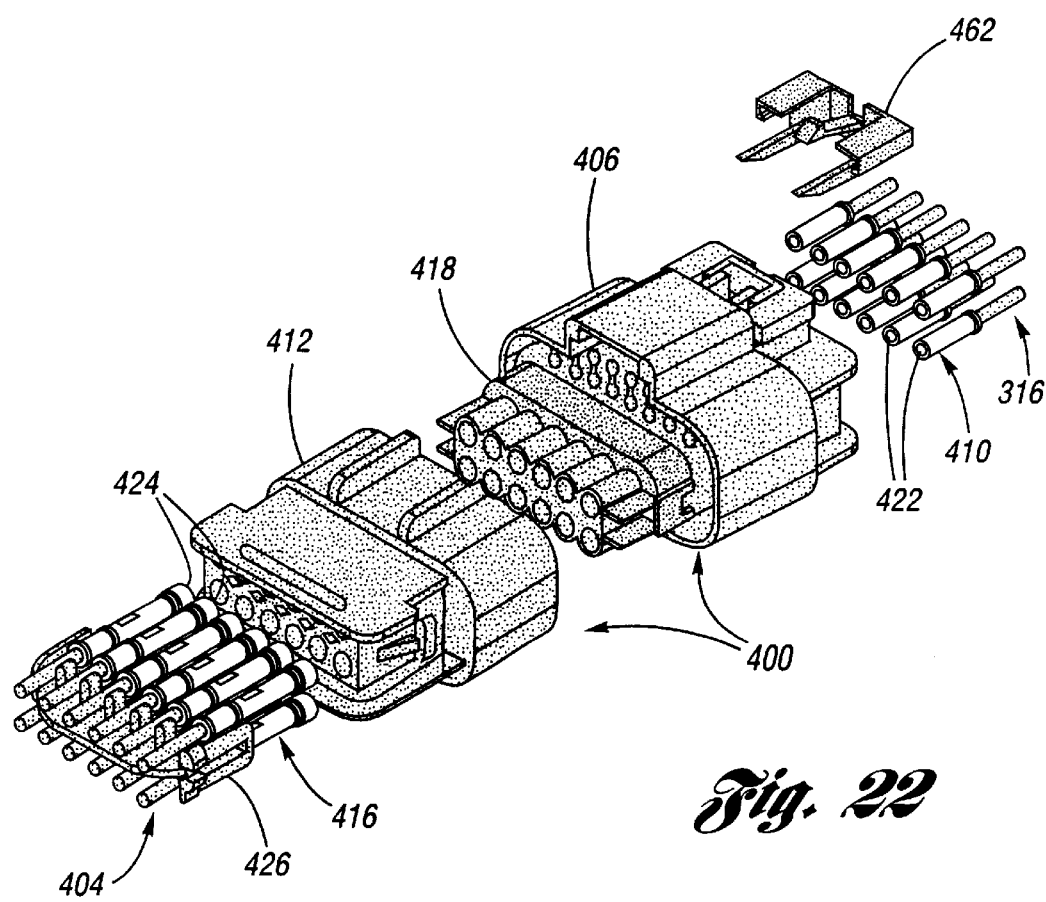

The plurality of GOF leads 316 are preferably of the multi-stranded type, each having a GOF upstream end 316a and an opposite GOF downstream end 422 (see FIG. 22). The plurality of GOF leads 316 enter the rear opening 312a of the connector ferrule 312 and the near end of the GOF leads 316 terminate at the GOF upstream face 318 at the front opening 312b of the connector ferrule. In this regard, the plurality of GOF leads 316 are stripped of their protective jacketing and are retained by epoxy 330 at a square shaped nose 332 of the connector ferrule 312.

Referring now additionally to FIGS. 13 through 19, the structure and functional features of the connector assembly 300 will be further detailed.

Figure 14:
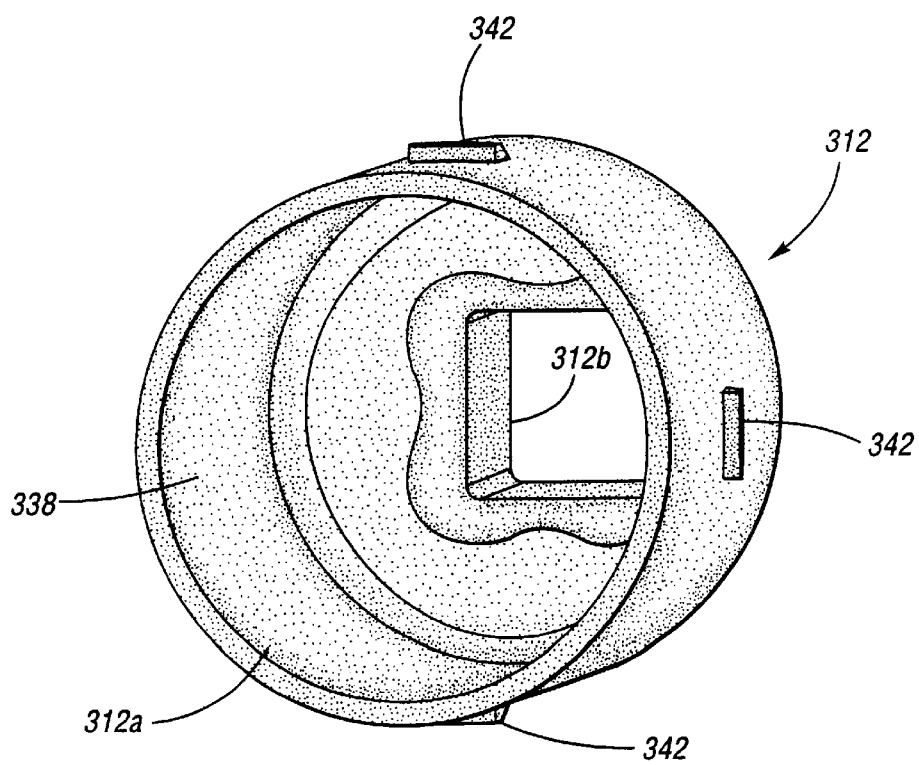

The connector ferrule 312 has a cylindrically shaped body 334, the aforementioned nose 332 and a tapered neck 336 integrally formed between the body and the nose. The body 334, neck 336 and nose 332 collectively form a chamber 338 extending from the rear opening 312a to the front opening 312b of the connector ferrule 312. As shown at FIG. 14, the chamber 338 is cylindrically shaped at the body 334, is taperingly contoured at the neck 336, and is square shaped at the nose 332.

Accordingly, the aforesaid bundling of the plurality of GOF leads 316 by the connector ferrule 312 is characterized by the GOF leads being guided from a generally cylindrical configuration at the rear opening 312a to a square configuration at the front opening 312b, and, as described hereinabove, secured thereto by epoxy 330. A chamfer 340 is preferably provided at the leading edge of the nose at the front end 312b to thereby aid retention of the GOF leads.

A lock ramp 342 is provided on the exterior of the body 334 of the connector ferrule 312 for lockably interconnecting with a resilient lock arm 344 of the connector housing 314 (see FIG. 20). Preferably four lock ramps are provided at ninety degree intervals of the circumference of the body 334, as will be further discussed hereinbelow.

Figure 17:
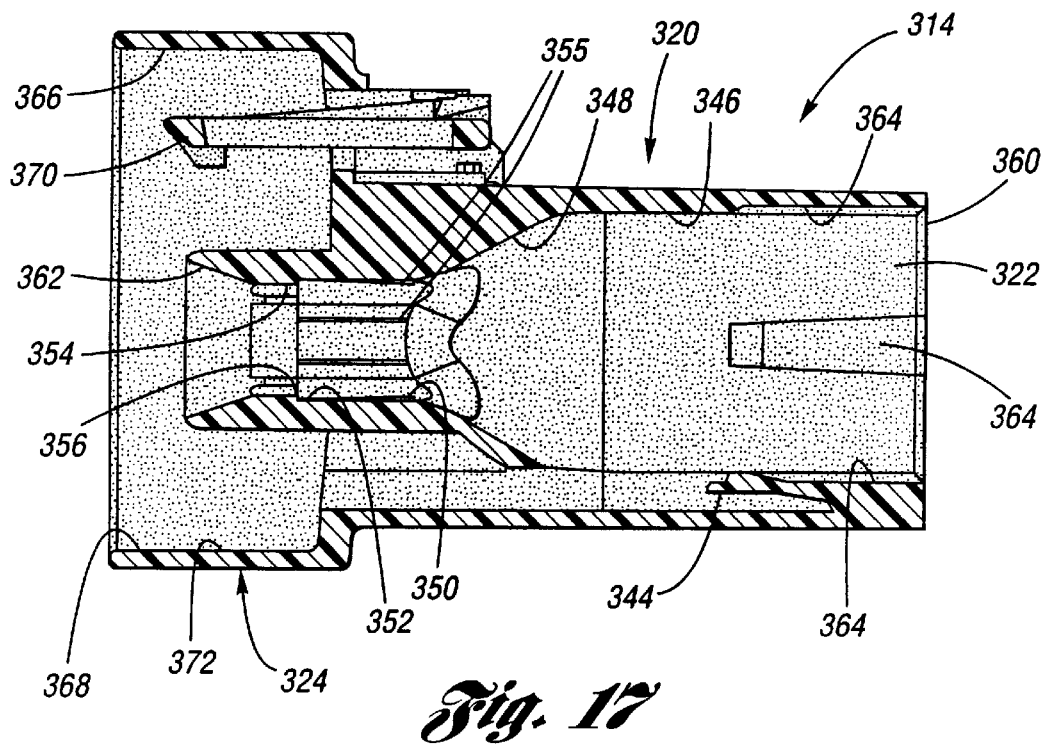
Figure 18:
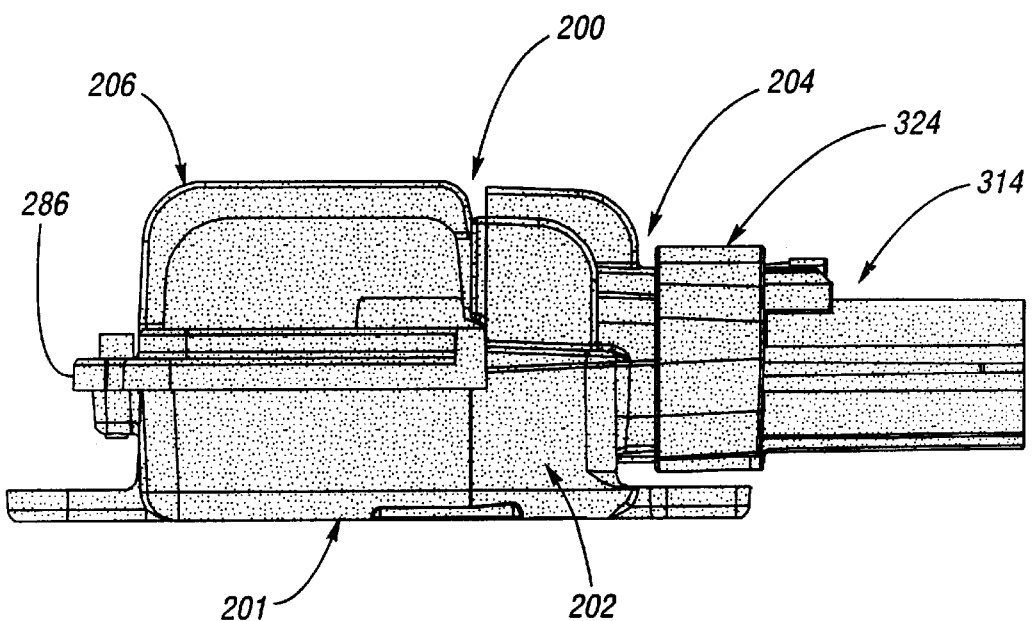
Figure 19:
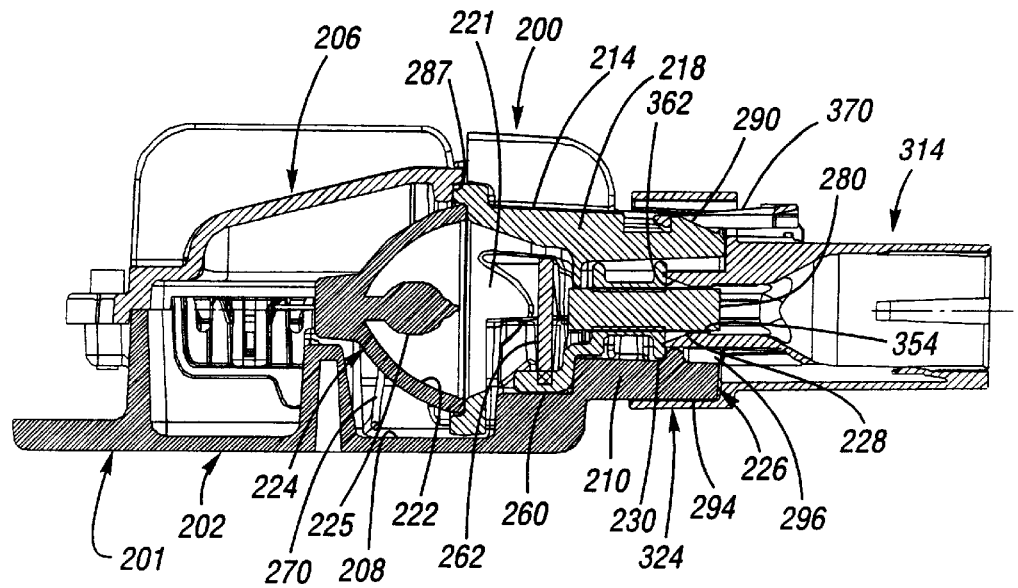

As mentioned hereinabove, the casing member 320 of the connector housing 314 has an interior hollow 322 that is reciprocally shaped to the exterior of the connector ferrule 312. As shown at FIGS. 20 and 17, the interior hollow 322 has a cylindrically shaped body seat 346 for receiving the ferrule body 334, a tapered neck seat 348 for receiving the ferrule neck 336 and a square shaped nose seat 350 for receiving the ferrule nose 332. The nose seat 350 has an abutment 352 for abutting the front end 312b of the connector ferrule 312, and a plurality of crush ribs 355 for guiding the ferrule nose 332 (see FIG. 17).

Aligned with the nose seat 350, and communicating therewith, is a square shaped rod seat 354 for receiving the aforementioned light transmission connecting rod 228. As shown best at FIG. 16, adjacent the nose seat 350, the rod seat 354 has a plurality of bosses 356 located at the corners thereof for supporting the light transmission connecting rod 228. The bosses 356 are minimized in order to ensure that they supportably contact only a minimal amount of the light transmission connecting rod 228. The corners are provided with an indentation 358 to prevent the light transmission connecting rod 228 from gouging the rod seat 354 as it is inserted thereinto.

The casing member 320 of the connector housing 314 has a rearward opening 360 at the body seat 346 into which the connection ferrule 312 is inserted, whereupon the GOF upstream face 318 is located at the abutment 352. The casing member has a flared forward opening 362 adjacent the rod seat 354 into which the light transmission connecting rod 228 is guidably inserted. In this regard, the light transmission connecting rod 228 is placed intentionally out of position toward the connector ferrule, so that when the connector ferrule mates therewith, the outer face 280 of the light transmission connecting rod is proximate to (within one-half millimeter), and precisely aligned with, the GOF upstream face 318.

A flute 364 is provided in the casing member 320 at the body seat 346 extending inwardly from the rearward opening 360 for receiving each lock ramp 342. The lock arm 344 forms a part of one of the flutes. The entry of the lock ramps 342 into a respective flute 364 pre-orients the nose 332 to the nose seat 350.

The connection member 324 of the connector housing 314 has predetermined alignment surfaces 368 and a no-draft interface surfaces 366 for mating with the housing 201 of the FOLSM 200. A pump handle lock 370 is provided for locking the connector housing 314 to the FOLSM, wherein a connector assurance member (not shown) inserts therein to retain the lock arm 370a thereof in an engaged relationship with a ramped ear 290 of the FOLSM. A slot 372 accepts a raised rib 374 of the FOLSM 200 for purposes of enhanced interconnection stability between the deeply drafted die cast aluminum of the FOLSM housing 201 and the molded plastic of the connector housing 314. The flared forward opening 362 abuts a resilient grommet 230 of the FOLSM, thereby establishing the primary seal between the connector assembly 300 and the FOLSM 200.

Figure 15:
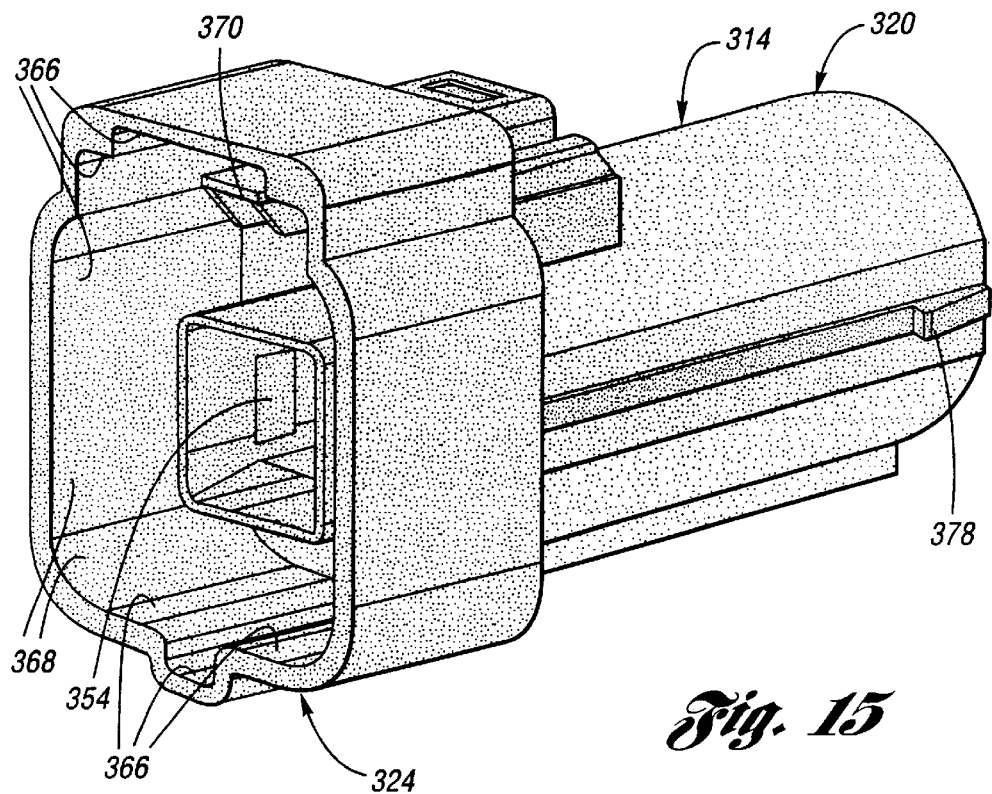
Figure 16:
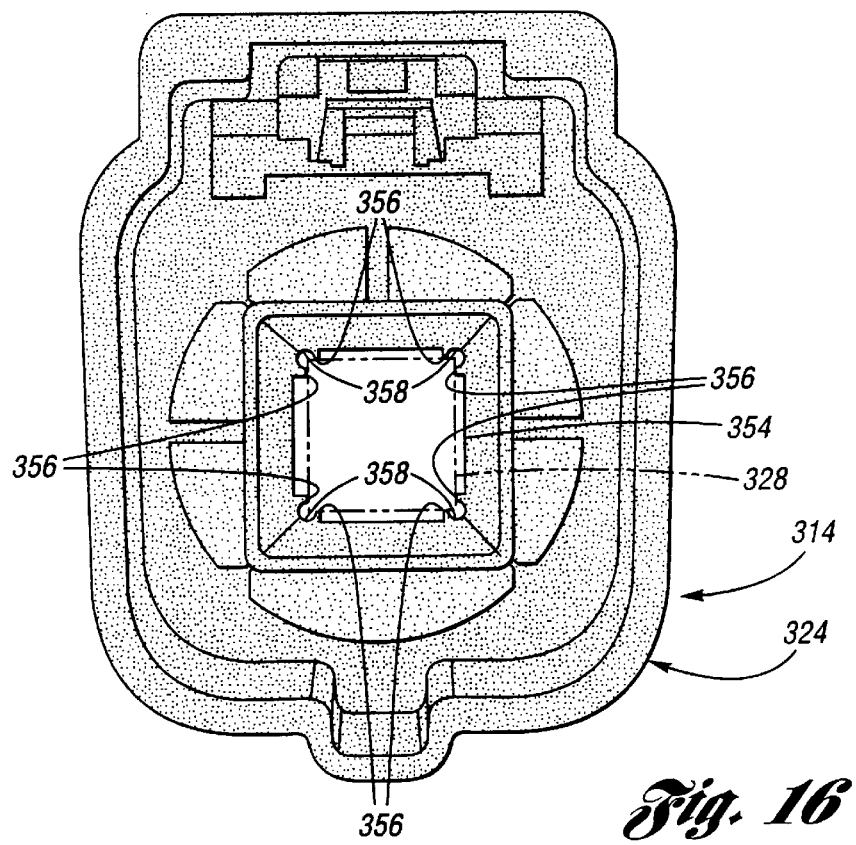

A pair of ramped locks 378 are provided on opposite sides of the exterior of the casing member 320 (see FIG. 15). A ferrule position assurance (FPA) member 380 has a semicircular shape, including a ferrule abutment feature 382 and opposed lock slots 384. In operation, the lock slots 384 engage the ramped locks 378, whereupon the FPA member 380 holds, secondarily to the lock arm 344, the connector ferrule 312 in its received relation with respect to the connector housing 314.

In operation, the GOF upstream face 318 is provided by stripped GOF leads 316 being affixed to the nose 332 by epoxy 330. The connector ferrule 312 is placed into the interior hollow 322 of the connector housing 314 so that the nose is fully seated in the nose seat 350. The FPA member 380 is snapped onto the ramped locks 378, thereby assisting the lock arm 344 to hold the connector ferrule in place inside the connector housing 314.

The light transmission connecting rod 228 is intentionally out of position with respect to the housing 201 so as to extend eruptably a preselected extra amount outwardly from the rod support 226. The connection member 324 is brought into engagement with the FOLSM housing 201, wherein the light transmission connecting rod 228 inserts into the rod seat 354. As the FOLSM housing 201 engages the connector housing 314, the flared forward opening 362 enters into the opening 296 of the rod support 226, centers the light transmission connecting rod with respect to the rod seat 354 and fly and sealingly abuts the resilient grommet 230. During engagement of the FOLSM housing 201 to the connector housing 314, the GOF leads 316 bundled by the connector ferrule 312 push upon the outer rod face 280 of the light transmission connecting rod so as to flex the resilient grommet 230 and thereby move the light transmission connecting rod from its out of position location inwardly toward the optics chamber 221. Now, the outer rod face 280 is aligned with, and proximate to, the GOF upstream face 318 of the GOF leads, whereupon light from the FOLSM supplies light to the GOF leads.

Figure 21:
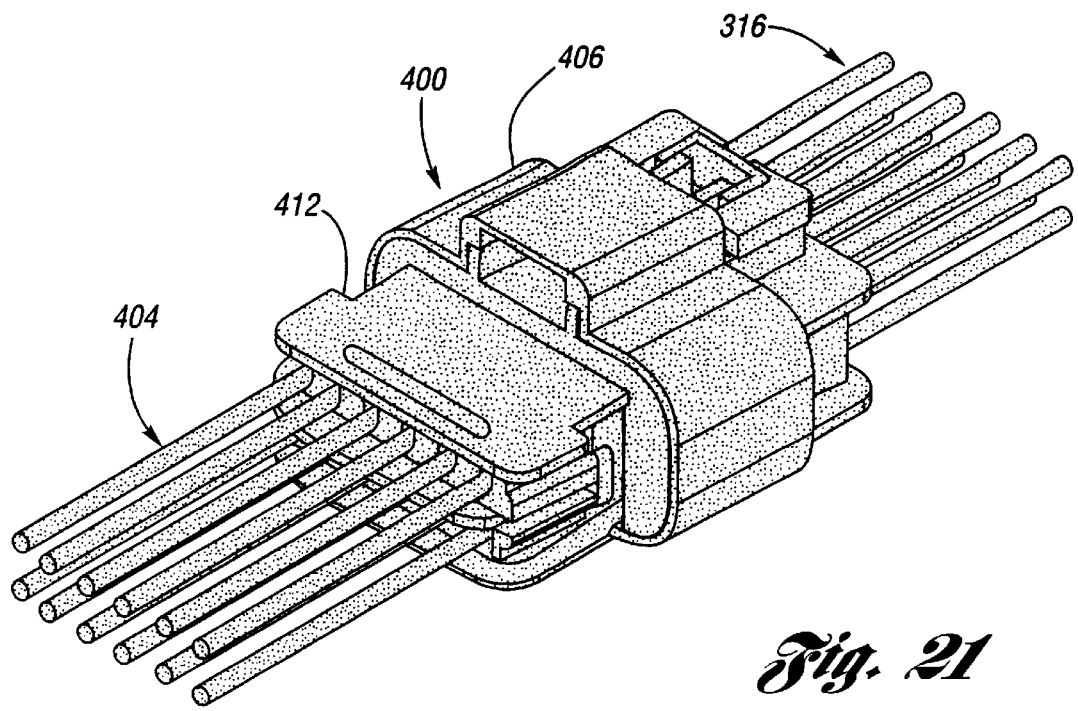

Referring now to FIGS. 21 and 22, the coupling assembly 400 according to the present invention is shown in operation with respect to optically interfacing a plurality of glass optical fiber (GOF) leads 316 to individually respective plastic optical fiber (POF) leads 404 of the hybrid fiber optic distribution system, wherein the coupling assembly is located, via the GOF leads, a predetermined distance from the FOLSM 200 at which distance the heat therefrom is low enough for the POF leads to be tolerant.

Figure 23:
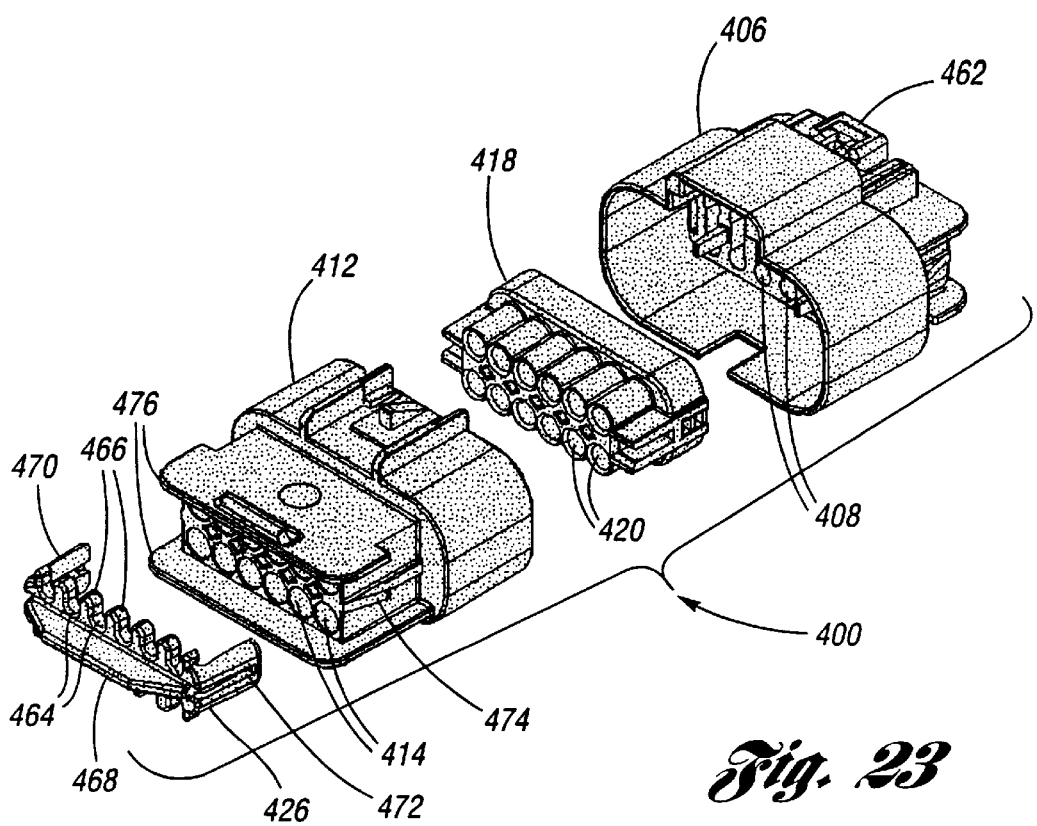

Referring now additionally to FIG. 23, the coupling assembly 400 includes a first coupling member 406 having first cavities 408 for individually receiving first ferrules 410 of the GOF leads 316, a slidably interfitting second coupling member 412 having second cavities 414 for individually receiving second ferrules 416 of the POF leads 404, an alignment body 418 which is interfaced with the first and second coupling members whereby mating cavities 420 thereof are aligned with the first and second cavities 408, 414 for providing a precisely aligned optical interface between the GOF downstream face 422 of the GOF leads and the POF upstream face 424 of the POF leads, and a second ferrule position assurance (second FPA) member 426.

Figure 27:
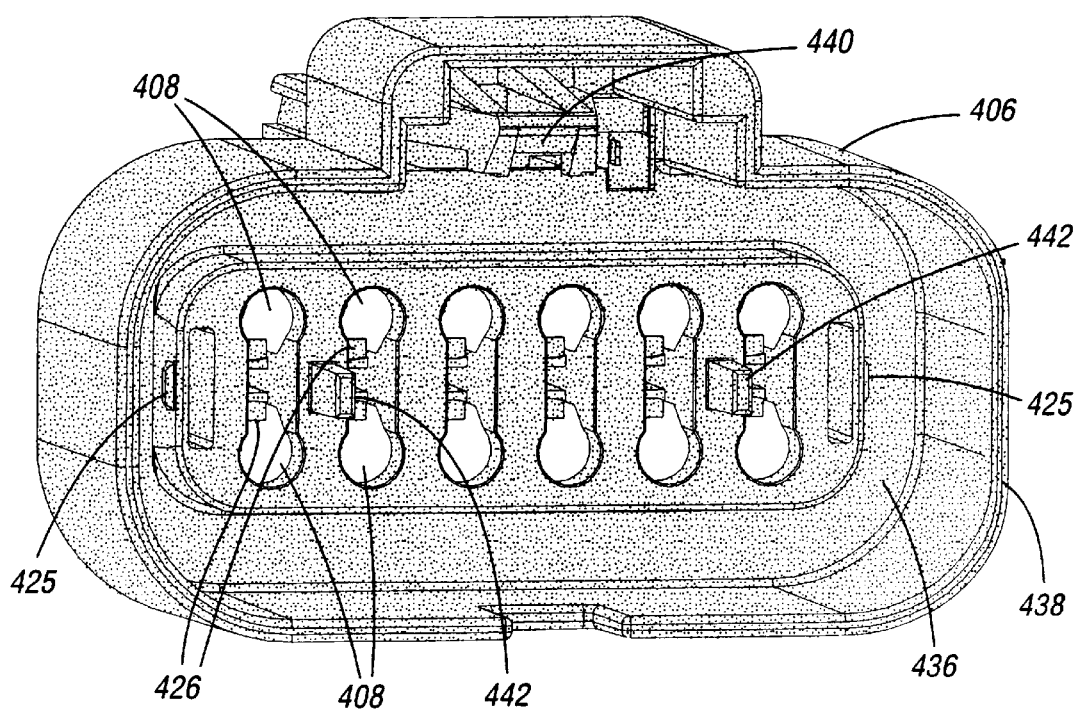
Figure 28:
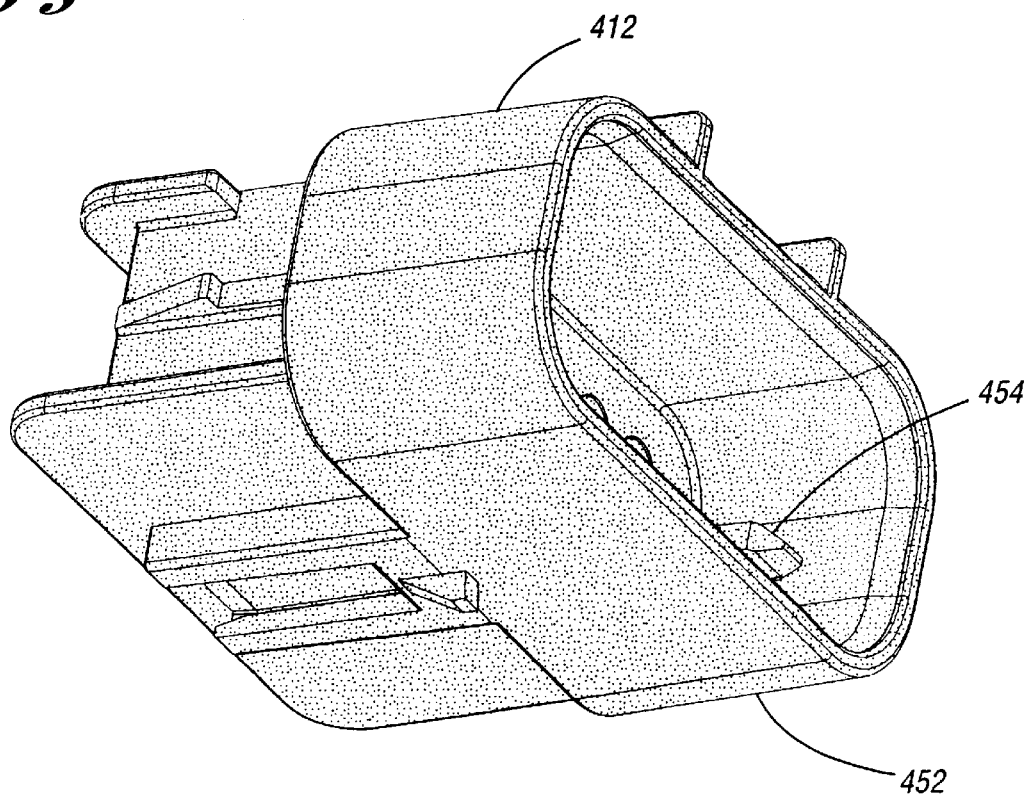
Figure 29:
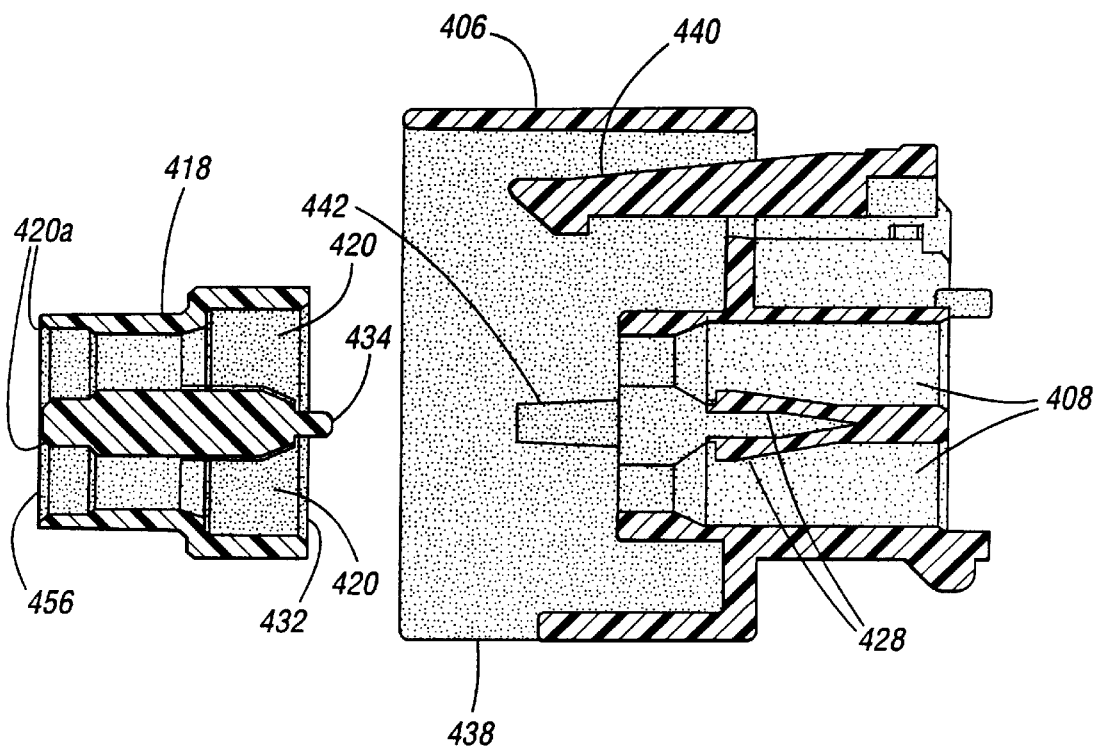
Figure 30:
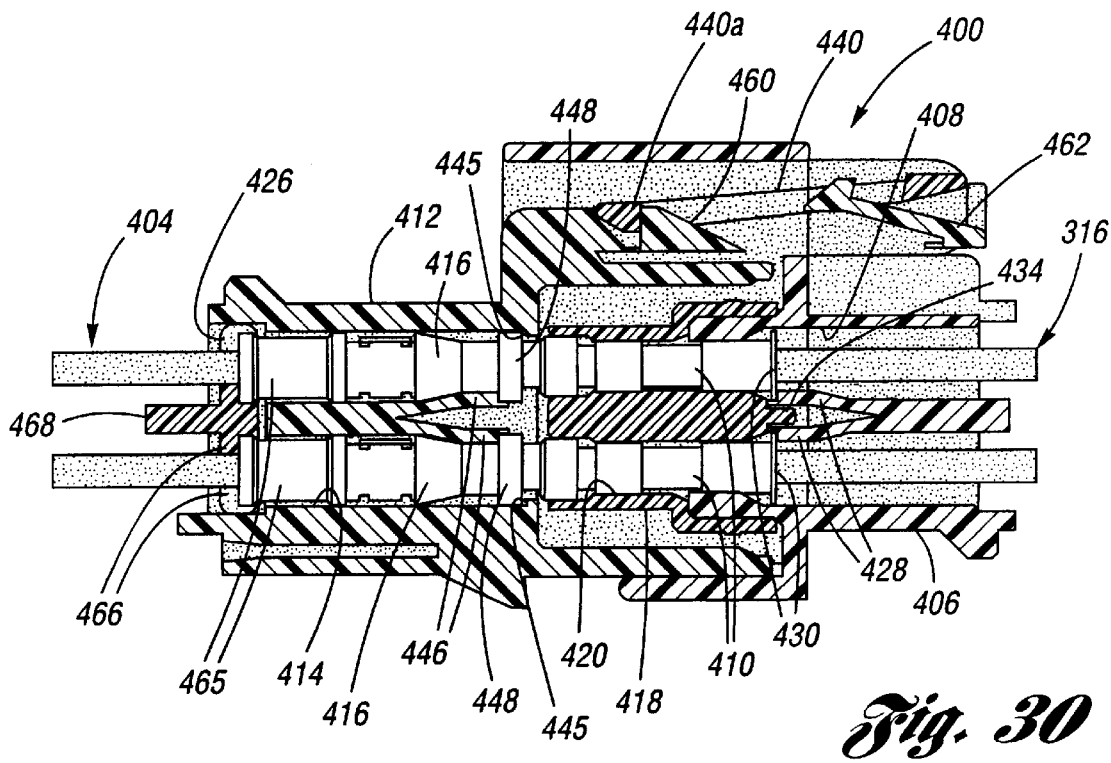

Referring now to the first coupling member 406, shown best at FIGS. 27, 29 and 30, each of the first cavities 408 includes a resilient first lock arm 428. Each first lock arm 428 is disposed into a respective first cavity 408 and resiliently engages a lock rim 430 of the first ferrule 410 received therein so as to abuttably prevent the first ferrule from backing out from the first cavity.

Figure 25:
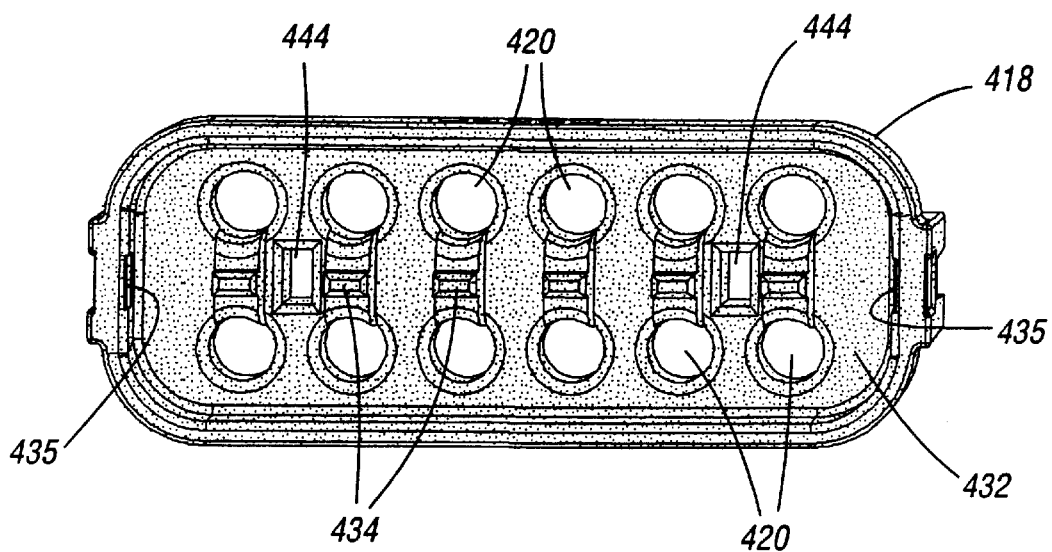

As shown best at FIGS. 25, 29 and 30, a first side 432 of the alignment body 418 has a plurality of positive lock reinforcement (PLR) fingers 434, wherein each is respectively received between a pair of opposing lock arms when the alignment body is interfaced with the first coupling member.

As shown at FIGS. 27 and 29, an inner surface 436 of the first coupling member 406 is recessed with respect to a first shroud 438, wherein an upper location of which carries a resilient main lock arm 440. A pair of axially oriented guide posts 442 project from the inner surface 436 for guidably interfacing with corresponding guide holes 444 on the first side 432 of the alignment body 418. As shown best at FIGS. 25 and 27, a pair of protuberances 425 adjacent the inner surface 436 of the first coupling member snappingly interact with a two-stage clip member 435 on either side of the alignment body 418 for providing connection therebetween at two staged positions.

Referring now to the second coupling member 412, shown best at FIGS. 24, 26, 28 and 30, each of the second cavities 414 includes a resilient second lock arm 446. Each second lock arm 446 is disposed into a respective second cavity 414 and resiliently engages a lock ring 448 of the second ferrule 416 received therein so as to abuttably prevent the second ferrule from backing out from the second cavity. A secondary abutment 445 in each second cavity 414 abuts the lock ring 448 so as to prevent the second ferrule from further advancing in the second cavity (see FIG. 30).

Figure 24:
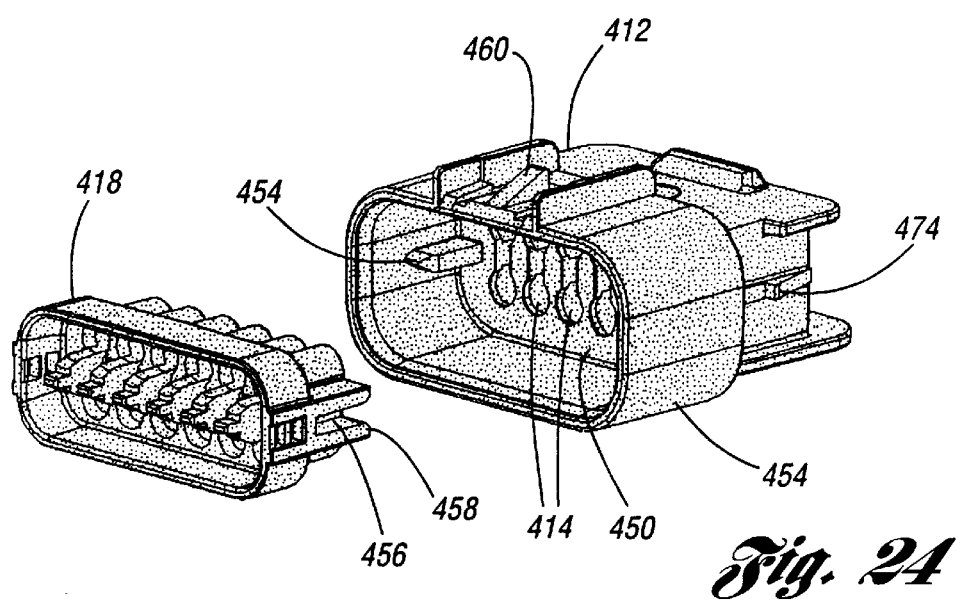
Figure 26:
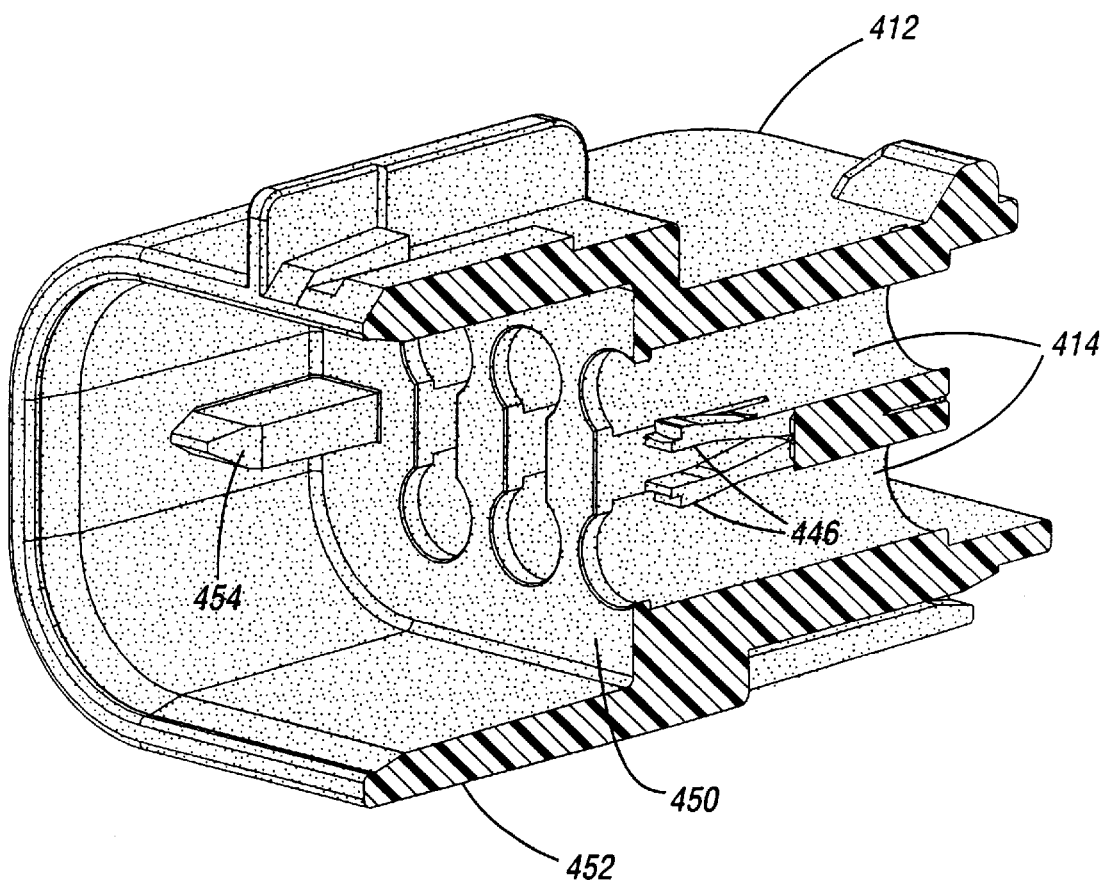

As shown best at FIGS. 24 and 26, the inner surface 450 of the second coupling member 412 is recessed with respect to a second shroud 452. A pair of axially oriented alignment rails 454 project from the inner surface 450 for guidably interfacing with corresponding alignment slots 456 of the alignment body 418 which communicate with a second side 458 of the alignment body.

A ramped boss 460 mounted to the second shroud 452 is structured to lock with respect to the main lock arm 440. As best shown at FIG. 30, a two-stage lock assurance member 462 is inserted into the first shroud 438, wherein the first stage retains it thereto, and the second stage prevents the bossed head 440a from pivoting away from the ramped boss 460 when the first and second coupling members are fully mated.

Referring now to the second FPA member 426, shown best at FIGS. 23 and 30, a plurality of lead slots 464 are defined on either side by retainer tabs 466. The retainer tabs 466 are dimensioned to compressibly abut cylindrical elastomeric or coil springs 465 (wherein elastomeric springs may serve a sealing function) located at the end of the second ferrules 416 (see FIG. 30). A stabilizer rib 468 is provided as a stiffener. On each side of the stabilizer rib 468 is a flexible leg 470. Each leg 470 has a slot 472 for receiving a ramped lip 474 located on each side of the second coupling member 412. In this regard, a pair of mutually opposed ledges 476 are provided on the second coupling member, opposite the second shroud 452, for guiding the second FPA 426 during assembly.

As indicated at FIG. 23, opposite the first shroud 438, the first coupling member 406 has ramped lips and mutually opposed ledges similar to the ramped lip 474 and mutually opposed ledges 476 of the second coupling member 412. These structures of the first coupling member 406 are provided, in similar function to those of the second coupling member, for an optional ferrule position assurance member (not shown) to be located thereat which may further provide a sealing function.

In operation of the coupling assembly 400, the first side 432 of the alignment body 418 is brought toward the inner surface 436 of the first coupling member 406 and locked thereto at a first stage by the two-stage clip member 435. The first ferrules 410 are then received into individually respective first cavities 408 of the first coupling member and mating cavities 420 of the alignment body so that the first lock arms 428 engage the lock rims 430 thereof. The alignment body is then locked to the first coupling member at a second stage by the two-stage clip member, whereupon the PLR fingers 434 lock the first lock arms in place.

The second ferrules 416 are received into individually respective second cavities 414 of the second coupling member 412 so that the second lock arms 446 engage the lock rings 448 thereof, whereupon the lock rings become trapped between the lock arms and the secondary abutments 445. The lead slots 464 of the second FPA member 426 receives each respective POF lead and is lockably affixed, via the legs 470 locking to the ramped lip 474 to the rear of the second coupling member. In this regard, the cylindrical spring 465 associated with each second ferrule is compressed with respect to the secondary abutment 445.

Next, the first and second coupling members are locked together, whereby the second shroud 452 is received by the first shroud 438 in a male-female type interaction. During this step, the second ferrules enter into respective mating cavities 420, aided by chamfers 420a (see FIG. 29), so that each first ferrule is aligned with a respective second ferrule and the cylindrical springs 465 bias the POF upstream faces into aligned abutment with individually respective GOF downstream faces.

The coupling assembly 400 according to the present invention has a number of benefits, including: alignment of different types and diameters of optical fibers; fewer pieces than conventional fiber optic connection devices; integration of functions into common components; utilization of a push-click-tug assembly method for both the GOF leads and the POF leads; superior alignment of mating components; and reduction of tolerance stacks due to elimination of large surfaces coming into contact.

To those skilled in the art to which this invention appertains, the above described preferred embodiments may be subject to change or modification. Such change or modification can be carried out without departing from the scope of the invention, which is intended to be limited only by the scope of the appended claims.

What is claimed is:

1. A hybrid fiber optic lighting distribution system comprising:
    light source means for providing a source of light;
    optical jumper means optically interfaced with said light source means for providing light transmission from said light source means via a first optical fiber media;
    optical distributor means for providing light transmission via a second optical fiber media other than said first optical fiber media; and
    coupling means for optically interfacing said optical jumper means to said optical distributor means at a preselected location from said light source means;
    wherein said second optical fiber media is temperature tolerant below a predetermined temperature, wherein said preselected location has a temperature below said predetermined temperature.

2. The hybrid fiber optic lighting distribution system of claim 1, wherein said first optical fiber media comprises glass optical fiber and said second optical fiber media comprises plastic optical fiber.

3. The hybrid fiber optic lighting distribution system of claim 2, wherein said glass optical fiber comprises a plurality of glass optical fiber leads, and wherein said plastic optic fiber comprises a plurality of plastic optical fiber leads.

4. The hybrid fiber optic lighting distribution system of claim 3, wherein said plurality of plastic optical fiber leads is temperature tolerant below a predetermined temperature, wherein said preselected location has a temperature below said predetermined temperature.

5. The hybrid fiber optic lighting distribution system of claim 4, wherein said coupling means comprises:
    a plurality of first ferrules, said plurality of glass optical fiber leads having a downstream face, each glass optical fiber lead being individually received within a respective first ferrule adjacent said downstream face thereof;
    plurality of second ferrules, said plurality of plastic optical fiber leads having an upstream face, each plastic optical fiber lead being individually received within a respective second ferrule adjacent said upstream face thereof;
    first coupling means for affixedly receiving one of said plurality of first and second ferrules; and
    second coupling means for receiving the other of said plurality of first and second ferules, said first and second coupling means being mutually connectable;
    wherein when said first and second coupling means are mutually connected, each glass optical fiber lead is optically interfaced with a respective plastic optical fiber lead.

6. The hybrid fiber optic lighting distribution system of claim 5, further comprising:
    connector ferrule means for bundling said plurality of glass optical fiber leads adjacent an upstream face thereof;
    connector housing means for connecting said connector ferrule means to said light source means; and coupling rod means connected with said light source means for transmitting light externally with respect to said light source means;

wherein when said connector ferrule means is connected with said light source means via said connector housing means, said upstream face of said plurality of glass optical fiber leads being optically interfaced with said coupling rod means.

7. A hybrid fiber optic lighting distribution system comprising:

light source means for providing a source of light;

optical jumper means optically interfaced with said light source means for providing light transmission from said light source means, said optical jumper means comprising a plurality of glass optical fiber leads;

optical distributor means for providing light transmission, said optical distributor means comprising a plurality of plastic optical fiber leads; and coupling means for optically interfacing said optical jumper means to said optical distributor means at a preselected location from said light source means;

wherein said plurality of plastic optical fiber leads is temperature tolerant below a predetermined temperature, wherein said preselected location has a temperature below said predetermined temperature.

* * * * *